United States Patent
Hasebe et al.

(10) Patent No.: US 9,350,188 B2
(45) Date of Patent: May 24, 2016

(54) ELECTRONIC DEVICE AND POWER-SOURCE DEVICE

(71) Applicants: Takashi Hasebe, Sagamihara (JP); Hiroshi Hiraguchi, Toyokawa (JP); Mineo Yamamoto, Toyokawa (JP); Tomonobu Tamura, Toyokawa (JP); Yuhei Tatsumoto, Toyokawa (JP)

(72) Inventors: Takashi Hasebe, Sagamihara (JP); Hiroshi Hiraguchi, Toyokawa (JP); Mineo Yamamoto, Toyokawa (JP); Tomonobu Tamura, Toyokawa (JP); Yuhei Tatsumoto, Toyokawa (JP)

(73) Assignee: KONICA MINOLTA BUSINESS TECHNOLOGIES, INC., Chiyoda-Ku, Tokyo (JP)

(*) Notice: Subject to any disclaimer, the term of this patent is extended or adjusted under 35 U.S.C. 154(b) by 583 days.

(21) Appl. No.: 13/764,800

(22) Filed: Feb. 12, 2013

(65) Prior Publication Data
US 2013/0214606 A1 Aug. 22, 2013

(30) Foreign Application Priority Data
Feb. 16, 2012 (JP) ................................. 2012-031424

(51) Int. Cl.
H02J 4/00 (2006.01)
H02J 7/00 (2006.01)
G03G 15/00 (2006.01)

(52) U.S. Cl.
CPC ............ *H02J 7/007* (2013.01); *G03G 15/5004* (2013.01); *G03G 15/80* (2013.01); *H02J 4/00* (2013.01); *H02J 7/0075* (2013.01); *G03G 2215/00126* (2013.01); *G03G 2215/00983* (2013.01); *Y10T 307/696* (2015.04)

(58) Field of Classification Search
CPC .............. G03G 15/5004; G03G 15/80; G03G 2215/00126; G03G 2215/00983; H02J 4/00; H02J 7/007; H02J 7/0075; Y10T 307/696
See application file for complete search history.

(56) References Cited

U.S. PATENT DOCUMENTS

| 5,942,878 A | * | 8/1999 | Ito | .......................... H02J 7/0075 320/131 |
| 6,265,877 B1 | * | 7/2001 | Kimura | ................. H01M 10/48 320/136 |

(Continued)

FOREIGN PATENT DOCUMENTS

| CN | 1627591 A | 6/2005 |
| JP | 7-298504 A | 11/1995 |

(Continued)

OTHER PUBLICATIONS

Office Action issued on Sep. 2, 2014, by the State Intellectual Property Office of the People's Republic of China in corresponding Chinese Patent Application No. 201310051216.6, and an English Translation of the Office Action. (19 pages).

(Continued)

*Primary Examiner* — M Elamin
(74) *Attorney, Agent, or Firm* — Buchanan Ingersoll & Rooney PC

(57) ABSTRACT

Electronic device comprising: processing unit including accepting part accepting processing request from external device and executing process specified by request; secondary battery connected with external power source; and power-source device transitioning to operating state when request is accepted in waiting state, and transitioning to waiting state when processing unit completes executing process, wherein, in waiting state, power supply from external power source to processing unit is stopped and secondary battery supplies power to accepting part, and in operating state, power is supplied from external power source to processing unit. Power-source device includes controller executing first charge control operation to cause external power source to charge secondary battery when, in operating state, voltage of secondary battery is not higher than threshold, and end executing first charge control operation when transitioning to waiting state, controller updating threshold in response to increase in number of times first charge control operation is executed.

8 Claims, 12 Drawing Sheets

(56) References Cited

U.S. PATENT DOCUMENTS

| | | | |
|---|---|---|---|
| 7,459,884 B2 | 12/2008 | Sasaki et al. | |
| 2004/0121223 A1* | 6/2004 | Kim | H01M 2/1022 429/61 |
| 2005/0134223 A1 | 6/2005 | Shigeeda | |
| 2008/0160392 A1* | 7/2008 | Toya | H01M 2/027 429/90 |
| 2011/0156656 A1 | 6/2011 | Saito | |

FOREIGN PATENT DOCUMENTS

| JP | 9-120843 A | 5/1997 |
|---|---|---|
| JP | 2002-75463 A | 3/2002 |
| JP | 2004-23975 A | 1/2004 |
| JP | 2005-315597 A | 11/2005 |
| JP | 2009-52975 A | 3/2009 |
| JP | 2011-50143 A | 3/2011 |
| JP | 2011-229274 A | 11/2011 |

OTHER PUBLICATIONS

Office Action (Notice of Reasons for Refusal) issued on Feb. 18, 2014, by the Japanese Patent Office in corresponding Japanese Patent Application No. 2012-031424, and an English Translation of the Office Action. (5 pages).

* cited by examiner

ELECTRONIC DEVICE AND POWER-SOURCE DEVICE

This application is based on application No. 2012-31424 filed in Japan, the contents of which are hereby incorporated by reference.

BACKGROUND OF THE INVENTION (1) Field of the Invention

The present invention relates to an electronic device, such as an image forming apparatus, loaded with a secondary battery, and to a power-source device used in the electronic device.

(2) Description of the Related Art

Some electronic devices use, in parallel, (i) power supplied from a commercial power source (external power source) and (ii) power supplied from a secondary battery such as a nickel hydride battery.

For example, the following MFP (Multiple Function Peripheral) device, a type of electronic device, has been proposed. That is to say, the MFP device includes a processing unit that includes: an image forming unit for executing an image forming operation; and an accepting unit including an external interface or the like for accepting a processing request (instruction) for the image forming unit. For the MFP device, a structure for switching the device between an operating state and a waiting state has been proposed, wherein, in the operating state, the image forming operation is executed.

Here, the waiting state is a state in which power is not supplied from the commercial power source (external power source) to the image forming unit and the accepting unit (including the external interface or the like), but power is supplied from the secondary battery to the accepting unit. Also, the operating state is a state in which power is supplied from the commercial power source to the image forming unit and the accepting unit.

When the MFP device does not execute the image forming operation, the MFP device is switched to the waiting state. This prevents the power from the commercial power source from being used in the waiting state, thus saving power consumption. Furthermore, since power is supplied from the secondary battery to the accepting unit in the waiting state, the accepting unit can accept a processing request for image formation even in the waiting state.

In such an image forming apparatus, when the capacity of the secondary battery decreases, an amount of power sufficient enough to make the accepting unit operable may not be supplied to the accepting unit, and the accepting unit including the external interface or the like may not accept a processing request for image formation in the waiting state. To prevent this in advance, a decrease in the capacity of the secondary battery may be detected and the secondary battery may be charged at an appropriate timing so that the secondary battery is recharged to the original capacity.

Patent Literature 1 (Japanese Patent Application Publication No. 2009-052975) discloses a structure for setting in advance a correspondence between the remaining capacity of the secondary battery (assembled battery) and the terminal voltage of the secondary battery such that the higher the internal resistance of the secondary battery is, the lower the terminal voltage is, and detecting the remaining capacity of the secondary battery based on the set correspondence.

Also, Patent Literature 2 (Japanese Patent Application Publication No. 2005-315597) discloses a structure for detecting the remaining capacity rate of the secondary battery with high accuracy by approximating the change in discharge voltage of the secondary battery from a full-charge state to a discharge end.

According to the structures of Patent Literatures 1 and 2, it is possible to detect the remaining capacity of the secondary battery with high accuracy, and charge the secondary battery at an appropriate timing when the remaining capacity of the secondary battery reaches a predetermined amount. This makes it possible to prevent the capacity of the secondary battery from decreasing in advance, and prevent the accepting unit from becoming unable to accept a processing request in the waiting state.

However, even if the remaining capacity of the secondary battery is detected with high accuracy as described in Patent Literatures 1 and 2, a so-called memory effect may occur in the secondary battery when an additional charge is repeatedly performed, wherein the additional charge is a charge that is performed at a timing when the remaining capacity of the secondary battery reaches a predetermined threshold. Note that the memory effect of the secondary battery is a phenomenon where, after a repetitive performance of the additional charge, the voltage of the secondary battery rapidly decreases at the timing when the remaining capacity of the secondary battery reaches the threshold.

When the memory effect occurs in the secondary battery, the external interface may not be operated appropriately since the voltage supplied from the secondary battery thereto decreases. Furthermore in that case, it may be erroneously judged that the secondary battery has come to the end of life, although in the actuality the secondary battery still has a usable amount of capacity.

SUMMARY OF THE INVENTION

It is therefore an object of the present invention to provide an electronic device that can be charged appropriately without occurrence of a memory effect in a secondary battery. It is another object of the present invention to provide a power-source device that can be used suitably in the electronic device.

The above object is fulfilled by an electronic device comprising: a processing unit that includes an accepting part configured to accept a processing request from an external device, and is configured to execute a process specified by the processing request; a secondary battery connected with an external power source; and a power-source device configured to transition from a waiting state to an operating state when the accepting part accepts a processing request while in the waiting state, and then transition from the operating state to the waiting state when the processing unit completes executing the process, wherein, in the waiting state, power supply from the external power source to the processing unit is stopped and the secondary battery supplies power to the accepting part, and in the operating state, power is supplied from the external power source to the processing unit, the power-source device including a controller that is configured to execute a first charge control operation to cause the external power source to charge the secondary battery when, in the operating state, a voltage of the secondary battery is equal to or lower than a threshold voltage, and end executing the first charge control operation when the operating state transitions to the waiting state, and the controller updating the threshold voltage in response to an increase in the number of times the first charge control operation is executed.

The above object is also fulfilled by a power-source device provided in an electronic device, the electronic device comprising: a processing unit that includes an accepting part configured to accept a processing request from an external device, and is configured to execute a process specified by the processing request; and a secondary battery connected with an external power source, the power-source device comprising: a controller configured to transition from a waiting state to an operating state when the accepting part accepts a processing request in the waiting state, and then transition from the operating state to the waiting state when the processing unit completes executing the process, wherein, in the waiting state, power supply from the external power source to the processing unit is stopped and the secondary battery supplies power to the accepting part, and in the operating state, power is supplied from the external power source to the processing unit, the controller executing a first charge control operation to cause the external power source to charge the secondary battery when, in the operating state, a voltage of the secondary battery is equal to or lower than a threshold voltage, and performing a control to end executing the first charge control operation when the operating state transitions to the waiting state, and a control to update the threshold voltage in response to an increase in the number of times the first charge control operation is executed.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF EMBODIMENTS

The following describes an embodiment of the present invention.

Figure 1:
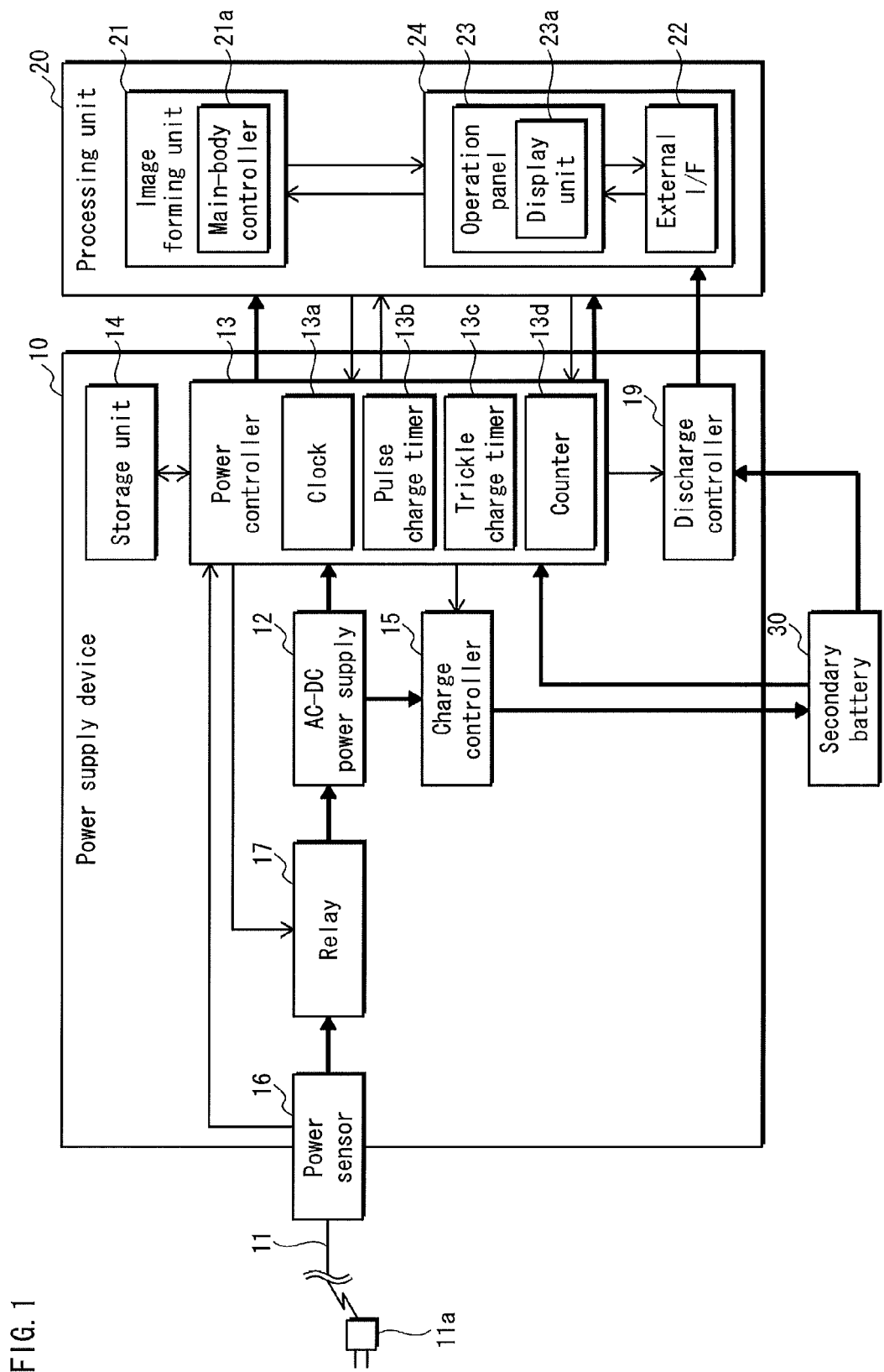
FIG. 1 is a block diagram illustrating the structure of an MFP device as one example of the electronic device according to the embodiment of the present invention.

FIG. 1 is a block diagram illustrating the structure of the image forming apparatus in the embodiment of the present invention. FIG. 1 illustrates an MFP (Multiple Function Peripheral) device, which is a multiple-function copier, as the image forming apparatus of the present embodiment.

The MFP device includes a processing unit 20 that includes: an image forming unit 21 for forming a toner image on a recording sheet based on the image data; and an accepting unit (an accepting part) 24 for accepting a processing request (an image formation instruction) for the image forming unit 21. The MFP device also includes: a power-source device 10 for performing, for example, a control to supply power, which is supplied from a commercial power source (external power source), to the processing unit 20; and a secondary battery 30 for supplying power to the power-source device 10 and the accepting unit 24 of the processing unit 20.

The image forming unit 21 of the processing unit 20 includes a main-body controller 21a for controlling an image formation operation.

The accepting unit 24 of the processing unit 20 includes: an external interface (I/F) 22 for transmitting and receiving data to/from external devices (a personal computer, a facsimile machine, another printer and the like) such as a terminal device connected to a network; and an operation panel 23 to which various information are input.

The processing unit 20 enters the operating state when it is supplied a direct current (DC) power from a power-source controller 13. When the accepting unit 24 accepts an image formation instruction, the processing unit 20 causes the image forming unit 21 to execute the image formation operation by the electrophotographic method based on image data which is received by the external I/F 22 when the image formation instruction is accepted. Also, upon receiving information from the operation panel 23, the main-body controller 21a displays the received information and the like on a display unit 23a provided in the operation panel 23.

The accepting unit 24 is operable as far as it is supplied power sufficient for it to be driven, whether the processing unit 20 is in the operating state or in the waiting state. Accordingly, the accepting unit 24 can accept a processing request (an image formation instruction) for the image forming unit 21 regardless of whether the image forming unit 21 is in the operating state or in the waiting state.

Note that the external I/F 22 of the accepting unit 24 may transmit and receive signals to/from the external devices via wires, not limited to wireless transmission and reception. However, it is desirable to use wireless transmission/reception since it reduces the power consumption by the external I/F 22. The operation panel 23 of the accepting unit 24 may also input information wirelessly.

The low-power-consumption wireless technology used in the external I/F 22 or the like includes an infrared communication, a visible light communication, and a body area network. Also, there are various wireless standards including ZigBee, Z-Wave, and Bluetooth-Low. Thus various wireless LANs and the like based on such standards are available.

The secondary battery 30 includes one or more cells that each generate electricity by the electrochemical reaction caused by a pair of electrodes and an electrolyte and discharge (supply) the generated electricity. The secondary battery 30 stores electricity by charging in which a current is supplied between the electrodes. As the secondary battery 30, a nickel hydride battery, for example, is used. Note that a memory effect may occur in the nickel hydride battery if the battery is repeatedly charged while the threshold voltage for an additional charge is maintained at a constant value.

The power-source device 10 includes an AC-DC power source 12 for supplying alternate current (AC) power via a power-supply line 11 which includes an outlet 11a that is connected to a commercial power source. The AC power supplied from the commercial power source via the power-supply line 11 is supplied to the AC-DC power source 12 via a latching type relay 17 that allows or stops the flowing of the supplied AC power.

The AC-DC power source 12 converts the AC power, which is supplied from the commercial power source via the power-supply line 11, to a DC power, and supplies the DC power to the power-source controller 13 and a charge controller 15.

Note that the power-source device 10 includes a power sensor 16 for detecting the AC power supplied from the commercial power source via the power-supply line 11, and the detection result of the power sensor 16 is sent to the power-source controller 13.

The DC power supplied from the AC-DC power source 12 enables the power-source controller 13 to perform various controls. Also the DC power supplied from the secondary battery 30 enables the power-source controller 13 to perform various controls.

The power-source controller 13 switches the latching type relay 17 between a power-supply state and a power stop state to cause the processing unit 20 to transition between the operating state and the waiting state.

The latching type relay 17 switches between the power-supply state and the power stop state in accordance with an instruction received from the power-source controller 13, wherein in the power-supply state, the latching type relay 17 supplies the AC power from the commercial power source to the AC-DC power source 12, and in the power stop state, the latching type relay 17 does not supply the AC power from the commercial power source to the AC-DC power source 12. After the latching type relay 17 is switched to either state, the state after the switching is maintained even if power is not supplied to the latching type relay 17 itself.

When the relay 17 is switched to the power stop state, the AC power from the commercial power source is not supplied to the AC-DC power source 12, and thus the AC power from the commercial power source is not supplied to the image forming unit 21 and the accepting unit 24 of the processing unit 20. However, power from the secondary battery 30 is supplied to the accepting unit 24 via a discharge controller 19 which is described below. This causes the processing unit 20 to be in the waiting state.

On the other hand, when the relay 17 is switched to the power-supply state, the AC power from the commercial power source is supplied to the AC-DC power source 12 via the power-supply line 11. The AC-DC power source 12 converts the supplied AC power to a DC power. The power-source controller 13, in the operating state, supplies the DC power converted by the AC-DC power source 12 to the image forming unit 21 and the accepting unit 24 of the processing unit 20, and further supplies the DC power to the charge controller 15 that controls the charging of the secondary battery 30.

The power-source device 10 includes the charge controller 15 to which the DC power converted by the AC-DC power source 12 is supplied. The charge controller 15, in accordance with a charging instruction from the power-source controller 13, performs charging of the secondary battery 30 by using the DC power supplied from the AC-DC power source 12. The power-source controller 13 determines whether or not it is necessary to charge the secondary battery 30, by measuring the voltage (Vbat) of the power supplied from the secondary battery 30.

Note that, even when it is not receiving a power supply from the AC-DC power source 12, the power-source controller 13 is capable of performing a control with the power supplied from the secondary battery 30, and performs a control to switch the state of the relay 17 by outputting a switch signal to the relay 17.

The power-source device 10 further includes a discharge controller 19 for controlling the supply (discharge) and the interruption (stop discharging) of the power from the secondary battery 30 to the accepting unit 24 of the processing unit 20.

The discharge controller 19 causes the secondary battery 30 to supply power to the accepting unit 24 in accordance with a discharge instruction from the power-source controller 13, and stops the secondary battery 30 from supplying (discharging) power to the accepting unit 24 in accordance with a discharge stop instruction from the power-source controller 13.

When the processing unit 20 is in the waiting state, the power-source controller 13 instructs the discharge controller 19 to cause the secondary battery 30 to discharge, and when the processing unit 20 transitions from the waiting state to the operating state, the power-source controller 13 instructs the discharge controller 19 to stop the secondary battery 30 from discharging.

Note that, when the image forming unit 21 ends an image formation and is capable of transitioning from the operating state to the waiting state, the main-body controller 21a of the image forming unit 21 notifies the power-source controller 13 that the image forming unit 21 is in an operation end state. The operation end state is (i) a state immediately after the image forming unit 21 has ended an image formation, (ii) a state after a predetermined time period has passed after an end of one image formation operation, or (iii) a state after a predetermined wait time period has passed after an end of a plurality of image formation operations before an instruction of the next image formation operation is accepted.

Upon receiving the operation end notification from the main-body controller 21a, the power-source controller 13 switches the relay 17 to the power stop state by setting a waiting state flag (not illustrated). With this switch, the power from the commercial power source is not supplied to the processing unit 20.

In this case, the power-source controller 13 instructs the discharge controller 19 to supply the power from the secondary battery 30 to the accepting unit 24 of the processing unit 20. This enables the accepting unit 24 to use the power supplied from the secondary battery 30 to accept an image formation instruction for the image forming unit 21 when the processing unit 20 is in the waiting state.

Upon accepting an image formation instruction for the image forming unit 21, the accepting unit 24 notifies the power-source controller 13 of the acceptance. Upon receiving the notification of an acceptance of an image formation instruction from the accepting unit 24, the power-source controller 13 switches the relay 17 to the power-supply state by setting an operating state flag (not illustrated) instead of the waiting state flag. With this switch, the power from the commercial power source is supplied to the processing unit 20, and the processing unit 20 transitions to the operating state. In parallel with the switching of the relay 17, the power-source controller 13 instructs the discharge controller 19 to stop the secondary battery 30 from supplying (discharging) power to the accepting unit 24.

Furthermore, when the processing unit 20 is in the operating state and it is detected that a voltage Vbat of the secondary battery 30 has decreased to a lower value than a predetermined voltage (first judgment threshold voltage at which the pulse charge is started) VLs, the power-source controller 13 instructs the charge controller 15 to execute a first charging control operation on the secondary battery 30. Here, the first charging control operation is a rapid charging operation that can bring the battery to a full-charge state or a state closer to the full-charge state in a relatively short time. In the present embodiment, the pulse charge is performed as the rapid charging operation.

The pulse charge of the secondary battery 30 is performed when the processing unit 20 is in the operating state, and when a cumulative charge time of the pulse charge performed in one day (cumulative pulse charge time) reaches a predetermined upper-limit pulse charge time (for example, one hour), the pulse charge is no more performed for the rest of the day, with one day being defined as the unit period of measurement, and set as, for example, 24 hours from a midnight. This is because, if the pulse charge is continued without limit when the processing unit 20 is in the operating state for a long time, the secondary battery 30 is overcharged, and if the overcharged state continues for a long time, the life of the secondary battery 30 may be reduced.

For this reason, the upper-limit pulse charge time (upper-limit value) is determined as follows. First, the total operation time of the processing unit 20 in one day (cumulative operation time) is estimated, and the rest of the time in one day other than the cumulative operation time is regarded as a wait time in which the processing unit 20 is in the waiting state. Then, a time period, which is minimum necessary for complementing by the pulse charge as much amount of electricity as is supplied (discharged) from the secondary battery 30 to the accepting unit 24 during the wait time, is calculated in advance. The calculated time period is determined as the upper-limit pulse charge time (upper-limit value).

Thus, the following operation is performed each day. That is to say, when the cumulative operation time for charging the secondary battery 30 by the pulse charge reaches the upper-limit pulse charge time, the pulse charge is no more performed for the rest of the day. Normally, with this operation, even if the discharge of the secondary battery 30 (supply of electricity to the accepting unit 24) continues, it is possible to prevent the remaining capacity of the secondary battery 30 from reducing to the first judgment threshold voltage VLs during the waiting state in the day.

Note that, although in the present embodiment, the upper-limit pulse charge time is determined relative to the cumulative operation time, the cumulative operation time varies to some extent depending on the use state of the MFP device by the user. Accordingly, in some MFP devices, the remaining capacity of the secondary battery 30 may decrease to reach the first judgment threshold voltage VLs during the waiting state.

For this reason, as an exceptional case, charging of the secondary battery 30 by the pulse charge is performed when the voltage Vbat of the secondary battery 30 decreases to below the first judgment threshold voltage VLs even if the processing unit 20 is in the waiting state, not limited to when the processing unit 20 is in the operating state.

Such a time period for which the secondary battery is charged by the pulse charge in the waiting state is measured to be included in the cumulative pulse charge time. Accordingly, during one day as the unit period of measurement, when the cumulative pulse charge time reaches the upper-limit pulse charge time, the pulse charge is no more performed for the rest of the day regardless of whether the processing unit 20 is in the waiting state or in the operating state.

For the reasons stated above, the power-source controller 13 includes a clock13a and a pulse charge timer 13b, wherein the clock13a is used to detect the midnight, and the pulse charge timer 13b is used to measure the cumulative pulse charge time during the period of 24 hours from the midnight.

Also, the power-source controller 13 performs a second charging control operation to charge the secondary battery 30 by applying a relatively small current that does not influence the characteristics of the secondary battery 30, when it is detected that the voltage Vbat of the secondary battery 30 has decreased to below the predetermined second judgment threshold voltage Vh while the processing unit 20 is in the operating state. In the present embodiment, the trickle charge is performed as the second charging control operation. The trickle charge is a method of charging the secondary battery 30 by applying thereto a small current barely sufficient to maintain the present voltage of the secondary battery 30, and has a smaller load of supplying power to the secondary battery 30 than the pulse charge (rapid charge).

As is the case with the pulse charge, during one day as the unit period of measurement, when the cumulative trickle charge time reaches the upper-limit trickle charge time (one hour, for example), the trickle charge is no more performed for the rest of the day.

For the reasons stated above, the power-source controller 13 includes a trickle charge timer 13c for measuring the cumulative trickle charge time during the period of 24 hours from the midnight.

Note that the power-source device 10 includes a storage unit 14 for storing various data and the like that are required for the charge controller 15 to control charging of the secondary battery 30 by the pulse charge and the trickle charge.

The storage unit 14 stores information of the first judgment threshold voltage VLs that is set in advance as a threshold to be used when the pulse charge is performed. The first judgment threshold voltage VLs is updated to a predetermined voltage value each time the number of times the pulse charge is performed reaches a predetermined number (100 in the present embodiment). The storage unit 14 stores the predetermined voltage value to which the first judgment threshold voltage VLs is updated each time the number of times the pulse charge is performed reaches the predetermined number. In the present embodiment, the first judgment threshold voltage VLs is lowered each time the number of times the pulse charge is performed reaches 100.

Specifically, the storage unit 14 stores information indicating the initial value of the first judgment threshold voltage VLs, and information associating respective update values of the first judgment threshold voltage VLs with the numbers of performances of the pulse charge, which are multiples of 100, namely, associating an update value V1 with 100, an update value V2 (<V1) with 200, an update value V3 (<V3) with 300, . . . .

The initial value of the first judgment threshold voltage VLs is set to a value that is selected from the voltage range of the secondary battery 30 when the secondary battery 30 is appropriately charged (appropriate range of charge voltages). The appropriate range of charge voltages is a range where the lower-limit value (0%) is the lowest voltage (approximately 1.0 V when the secondary battery 30 has the single-cell structure) in the allowable range in which the voltage Vbat of the secondary battery 30 is not regarded as the over-discharge state, and the upper-limit value (100%) is the highest voltage (approximately 1.7 V when the secondary battery 30 has the single-cell structure) in the allowable range in which the voltage Vbat is not regarded as the over-charged state.

It is desirable to set the initial value of the first judgment threshold voltage VLs, which corresponds to the number of times the pulse charge is performed, ranging from 0 to 99, to, for example, a voltage value that is approximately 70% of the appropriate range of charge voltages, which is estimated to cause the voltage Vbat of the secondary battery 30 to reach the upper-limit value (100%: for example, 1.7 V) of the appropriate range of charge voltages after the pulse charge is performed for one hour, starting with the state of the initial value, in accordance with the charge conditions for the pulse charge stored in the storage unit 14.

Note that, as described below, the first judgment threshold voltage VLs may be updated to a value that is higher than the above one.

The update value of the first judgment threshold voltage VLs is set such that it is updated at a predetermined rate (for example, at a rate of ±(1 to 5) %) each time the number of times the pulse charge is performed to charge the secondary battery 30 reaches 100.

The power-source controller 13 includes a counter 13d for counting the number of times the pulse charge is performed to charge the secondary battery 30, for the purpose of updating the first judgment threshold voltage VLs. The counter 13d continues to count the cumulative number of times the pulse charge is performed (cumulative performance number) without being reset until the secondary battery 30 is replaced, or until the secondary battery 30 reaches the end of life without replacement.

The power-source controller 13 reads a first judgment threshold voltage VLs corresponding to the counted cumulative number of times the pulse charge is performed, from the storage unit 14, and stores (holds) the read voltage into a storage area for storing a threshold voltage.

The storage unit 14 also stores information of a second judgment threshold voltage Vh that is a predetermined threshold used when the trickle charge is performed. The second judgment threshold voltage Vh is set to the upper-limit value (approximately 1.7 V when the secondary battery 30 has the single-cell structure) of the appropriate range of charge voltages.

Note that, when the MFP device is packed and shipped at the factory, a power stop member (not illustrated), for example, is inserted between (i) a pair of output electrodes of the secondary battery 30 and (ii) a pair of power-source terminals of the power-source controller 13, to prevent the secondary battery 30 from continuing to supply power to the power-source device 10, so that the secondary battery 30 and the power-source device 10 are in a power stop state in which they are not electrically connected with each other.

With this structure, during the transportation of the MFP device from the shipment at the factory to the delivery to the destined location, power is not supplied from the secondary battery 30 to the power-source controller 13, and any control is performed by the power-source controller 13.

The power stop member is removed at the delivery location of the MFP device when the MFP device is unpacked by a worker. After the power stop member is removed, the secondary battery 30 and the power-source controller 13 are electrically connected with each other, power is supplied from the secondary battery 30 to the power-source controller 13, and the power-source controller 13 starts performing various controls.

Note that, normally, as described above, the power stop state should be maintained by the power stop member during the transportation of the MFP device from the shipment at the factory to the delivery to the destined location. However, if the power stop member is removed due to a mechanical shaking, shock or the like during the transportation, the secondary battery 30, switching from the power stop state to the power-supply state, discharges electricity during the transportation, namely, an abnormal discharge state occurs. Accordingly, the power-source controller 13 has a function to perform a control to judge whether or not the abnormal discharge state has occurred.

Figure 2:
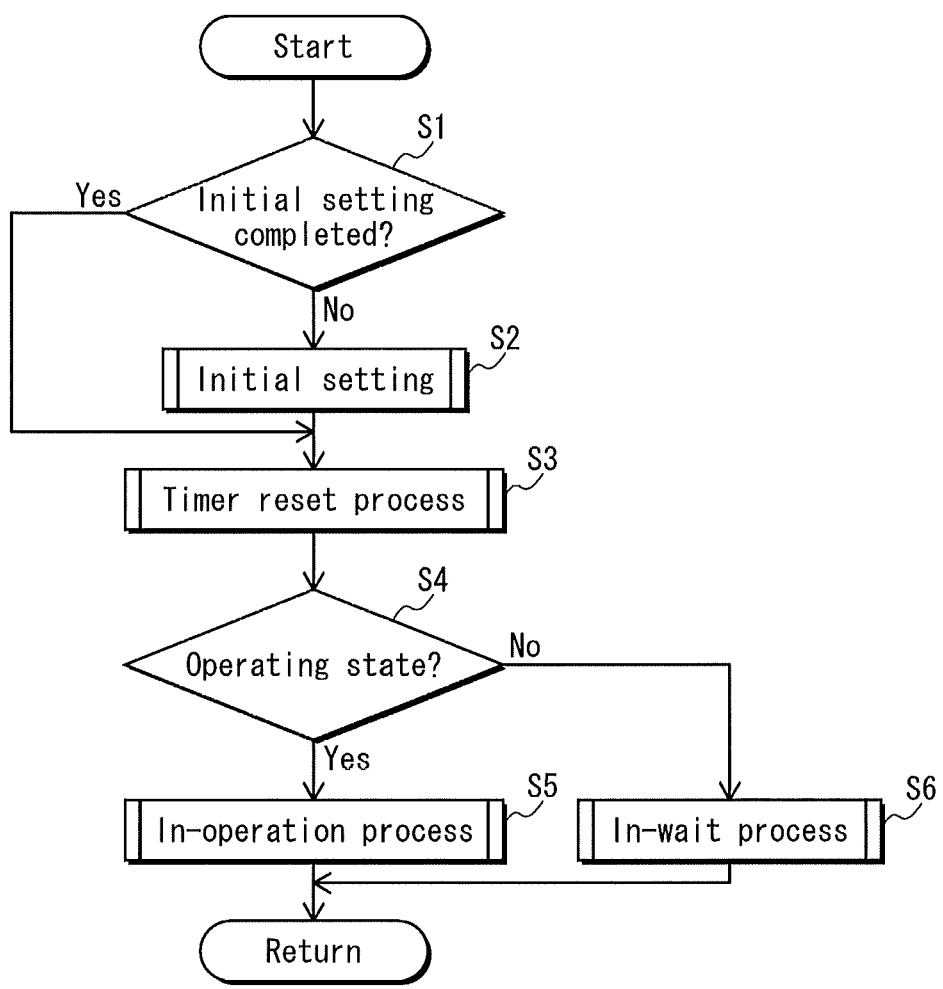
FIG. 2 is a flowchart illustrating the processing procedure of the controls performed by the power-source controller included in the power-source device of the MFP device.

The following describes contents of the controls performed by the power-source controller 13 of the power-source device 10, including the abnormal discharge state judgment control, with reference to FIG. 2.

FIG. 2 is a flowchart illustrating the contents of the controls performed by the power-source controller 13. When the power-source controller 13 becomes capable of performing a control upon receiving the power supplied from the secondary battery 30, the power-source controller 13 starts the control illustrated in FIG. 2. This control is repeatedly performed as the control is called by a main routine (not illustrated) while the power is supplied to the power-source controller 13.

As illustrated in FIG. 2, when the control by the power-source controller 13 is started, first it is judged whether or not the initial setting of the MFP device is completed (step S1). This initial setting means the initial setting to be executed in step S2.

When it is judged that the initial setting is not completed (No in step S1), the control proceeds to step S2 and the initial setting is executed; and when it is judged that the initial setting is completed (Yes in step S1), the control proceeds to step S3, skipping step S2.

In step S3, the timer reset process is executed, and then the control proceeds to step S4.

In step S4, it is judged whether or not the image forming unit 21 is in the operating state. This judgment is made by judging which of the operating state flag and the waiting state flag is set. Note that the waiting state flag is set while the initial setting is executed, and the flag is switched to the other state when an image formation instruction is accepted after the initial setting is ended.

When it is judged that the image forming unit 21 is in the operating state (Yes in step S4), the in-operation process is executed (step S5) and then the control returns. On the other hand, when it is judged that the image forming unit 21 is in the waiting state (No in step S4), the in-wait process is executed (step S6) and then the control returns.

Note that the image forming unit 21 alternately transitions to the operating state and the waiting state. The image forming unit 21 transitions from the operating state to the waiting state as follows. That is to say, after the in-operation process in step S5 is completed and when this control is to be performed next, it is judged that the image forming unit 21 is not in the operating state (No in step S4), and the in-wait process is executed in step S6. Conversely, the image forming unit 21 transitions from the waiting state to the operating state as follows. That is to say, after the in-wait process in step S6 is completed and when this control is to be performed next, it is judged that the image forming unit 21 is in the operating state (Yes in step S4), and the in-operation process is executed in step S5.

<Initial Setting>

Figure 3:
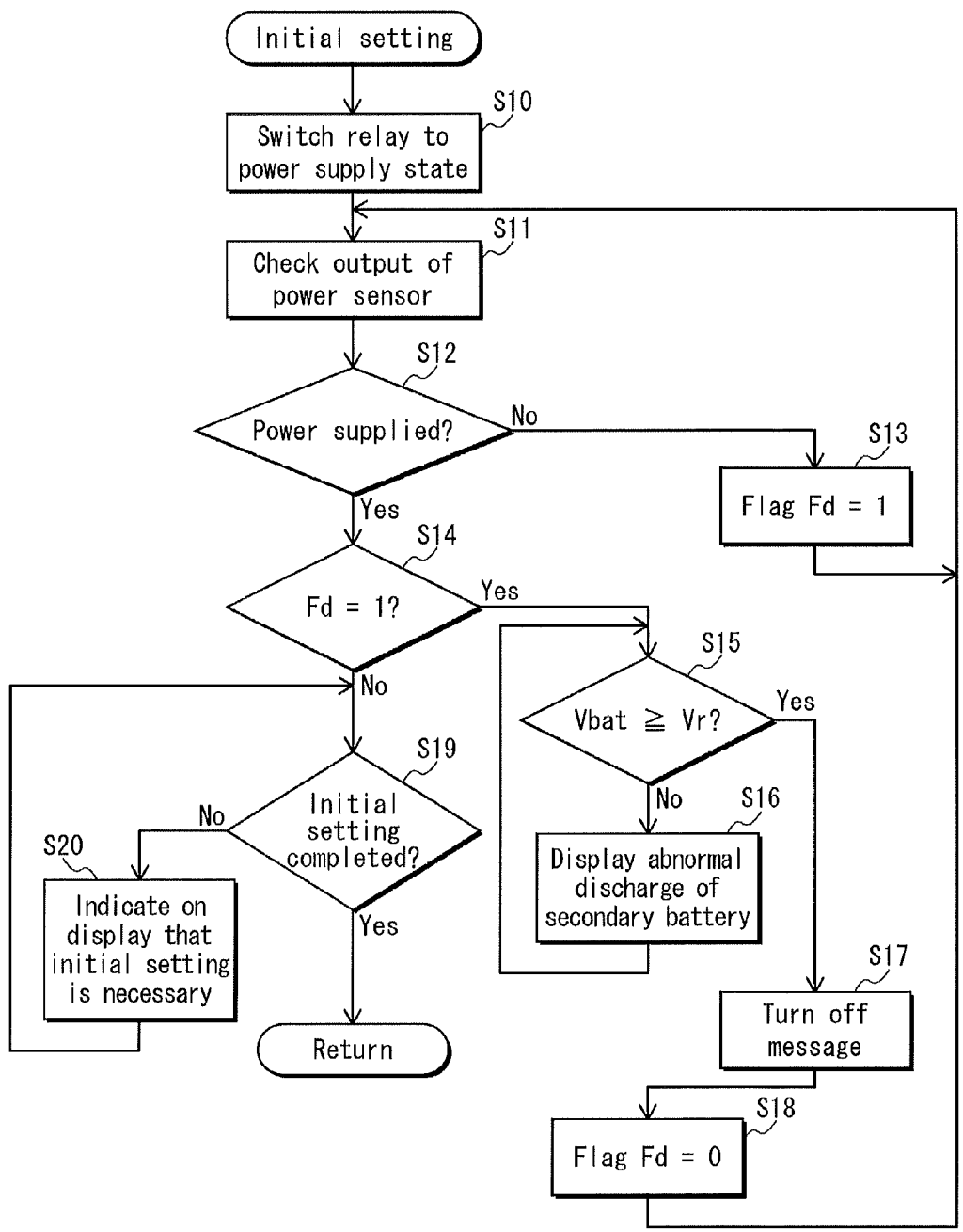
FIG. 3 is a flowchart illustrating the processing procedure of an initilial setting subroutine executed in step S2.

FIG. 3 is a flowchart illustrating the procedure of an initial setting subroutine executed in step S2.

The initial setting is executed first after the stop of power supply between the secondary battery 30 and the power-source controller 13 by the power stop member is removed and the power starts to be supplied from the secondary battery 30 to the power-source controller 13.

The power supply from the secondary battery 30 to the power-source controller 13 is started either (a) when the power stop member is removed in the state where the outlet 11a of the MFP device is connected with a commercial power source after the MFP device is unpacked at the location where the MFP device is delivered or (b) when the power stop member is removed due to shaking or the like during transpiration of the MFP device.

Here, when the MFP device is shipped from the factory, the relay 17 of the power-source device 10 is in the state of stopping the power supply (power stop state). It is thus presumed that the relay 17 is in the power stop state when the power-source controller 13 starts controlling.

As illustrated in FIG. 3, the power-source controller 13 first switches the relay 17 of the power-source device 10 from the power stop state to the power-supply state (step S10). Subsequently, the power-source controller 13 checks the output of the power sensor 16 (step S11).

It is judged, based on the check of the output of the power sensor 16, whether or not the AC power from the commercial power source is being supplied to the MFP device (step S12).

When the AC power from the commercial power source is being supplied, it means that the outlet 11a of the MFP device is connected with a commercial power source, namely, the MFP device is not being shipped. After it is confirmed that the AC power from the commercial power source is being supplied (Yes in step S12), the control proceeds to step S14.

On the other hand, when it is judged that the AC power from the commercial power source is not being supplied (No in step S12), the abnormal discharge flag Fd is set (Fd=1) on the presumption that the power stop member has been removed due to shaking, shock or the like during shipping of the MFP device (step S13), and the control returns to step S11. The abnormal discharge flag Fd is a flag stored in a nonvolatile storage unit 14 that is included in the power-source controller 13, and is set when the secondary battery 30 is in the abnormal discharge state in which the secondary battery 30 discharges while the MFP device is in the unusable state (in the packed state).

In that case, steps S11 through S13 are repeatedly performed, thereby maintaining the abnormal discharge state until it is confirmed in step S12 that the AC power from the commercial power source is being supplied. Subsequently, when the MFP device is unpacked, the outlet 11a of the power-supply line 11 is connected with a commercial power source, and it is judged that the AC power from the commercial power source is being supplied (Yes in step S12), the control proceeds to step S14.

In step S14, the power-source controller 13 checks whether or not the abnormal discharge flag Fd is set (Fd=1). When it is judged that the abnormal discharge flag Fd is not set (No in step S14), it is determined that the MFP device is in the normal state, namely, in the state where the abnormal discharge state has not occurred during the shipping of the MFP device, and the control proceeds to step S19.

On the other hand, when it is judged that the abnormal discharge flag Fd is set (Yes in step S14), it is judged whether or not the voltage Vbat of the secondary battery 30 is equal to or higher than the predetermined standard voltage Vr (step S15).

The standard voltage Vr is set to the second judgment threshold voltage Vh which is described below. With regard to a secondary battery 30 whose voltage Vbat is equal to or higher than the predetermined standard voltage Vr, the normal control can be performed thereon without need of charging due to decrease of capacity, as is the case with the secondary battery 30 in the new or full-charge state.

When it is judged that the voltage Vbat of the secondary battery 30 is lower than the predetermined standard voltage Vr (No in step S15), it is determined that the abnormal discharge state has occurred during the shipping of the MFP device, and a message or like indicating the abnormal discharge state or urging replacement of battery is displayed on the display unit 23a of the operation panel 23 provided in the image forming unit 21 of the processing unit 20 (step S16).

The worker or user, upon seeing a message indicating the abnormal discharge state of the secondary battery 30 and urging replacement of battery, can recognize that the capacity of the secondary battery 30 has decreased since the secondary battery 30 has been in the discharge state before the MFP device is unpacked. This allows the worker or user to charge or replace the secondary battery 30.

The display of this message is continued until the voltage Vbat of the secondary battery 30 is equal to or higher than the standard voltage Vr after the secondary battery 30 is replaced with a new one or a charged one (No in step S15; and step S16).

When it is judged that the voltage Vbat of the secondary battery 30 is equal to or higher than the standard voltage Vr after the secondary battery 30 is replaced with a new one or a charged one (Yes in step S15), the message having been displayed is turned off (step S17), and the control proceeds to step S18.

Note that, there may be a case where the voltage Vbat of the secondary battery 30 is equal to or higher than the standard voltage Vr when the MFP device is unpacked even if the discharge of the secondary battery 30 has started during the shipment. In that case, it is judged Yes in step S15 and the control proceeds to step S17. In that case, since the above message is not displayed, the control proceeds to step S18, skipping step S17.

In step S18, the abnormal discharge flag Fd is reset (Fd=0), thereafter the control returns to step S11, the processes of steps S11 and S12 are executed, and the control proceeds to step S14. At this point in time, the abnormal discharge flag Fd has been reset (Fd=0), and has not been set (Fd=1) (No in step S14). As a result, the control proceeds to step S19.

In step S19, the power-source controller 13 judges whether or not the initial setting is completed and the image forming unit 21 of the processing unit 20 is capable of executing the image formation operation, based on the notification received from the main-body controller 21a of the image forming unit 21. In that case, the main-body controller 21a of the image forming unit 21 notifies the power-source controller 13 that the initial setting is completed, when a predetermined initial setting in the image forming unit 21 is completed and the image forming unit 21 becomes capable of executing the image formation operation.

When the power-source controller 13 judges that the initial setting is not completed since it has not received the notification from the main-body controller 21a of the image forming unit 21 that the initial setting of the image forming unit 21 is completed (No in step S19), the power-source controller 13 determines that a worker has not executed the initial setting of the image forming unit 21, and indicates, on the display unit 23a of the operation panel 23 provided in the processing unit 20, that the initial setting of the image forming unit 21 is necessary (step S20), and waits until the initial setting of the image forming unit 21 is completed.

When the power-source controller 13 judges that the initial setting of the image forming unit 21 is completed because it has received the notification thereof from the main-body controller 21a (Yes in step S19), the control returns. This completes the initial setting of the MFP device.

<Timer Reset Process>

Figure 4:
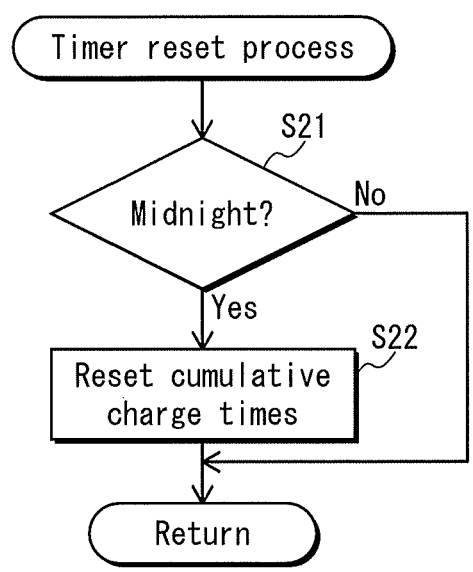
FIG. 4 is a flowchart illustrating the processing procedure of a timer reset process subroutine.

FIG. 4 is a flowchart illustrating the procedure of a timer reset process subroutine executed in step S3 illustrated in FIG. 2.

As illustrated in FIG. 4, the power-source controller 13 checks whether or not the clock 13a indicates the midnight (step S21). When the clock 13a indicates the midnight (Yes in step S21), the power-source controller 13 judges that one day (24 hours), which is defined as the unit period of measurement of the cumulative pulse charge time and the cumulative trickle charge time, has passed, and resets both of a pulse charge timer 13b and a trickle charge timer 13c that measure the cumulative pulse charge time and the cumulative trickle charge time, respectively (step S22), and the control returns.

When the clock 13a does not indicate the midnight (No in step S21), the control returns, skipping step S22.

<In-Operation Process>

Figure 5:
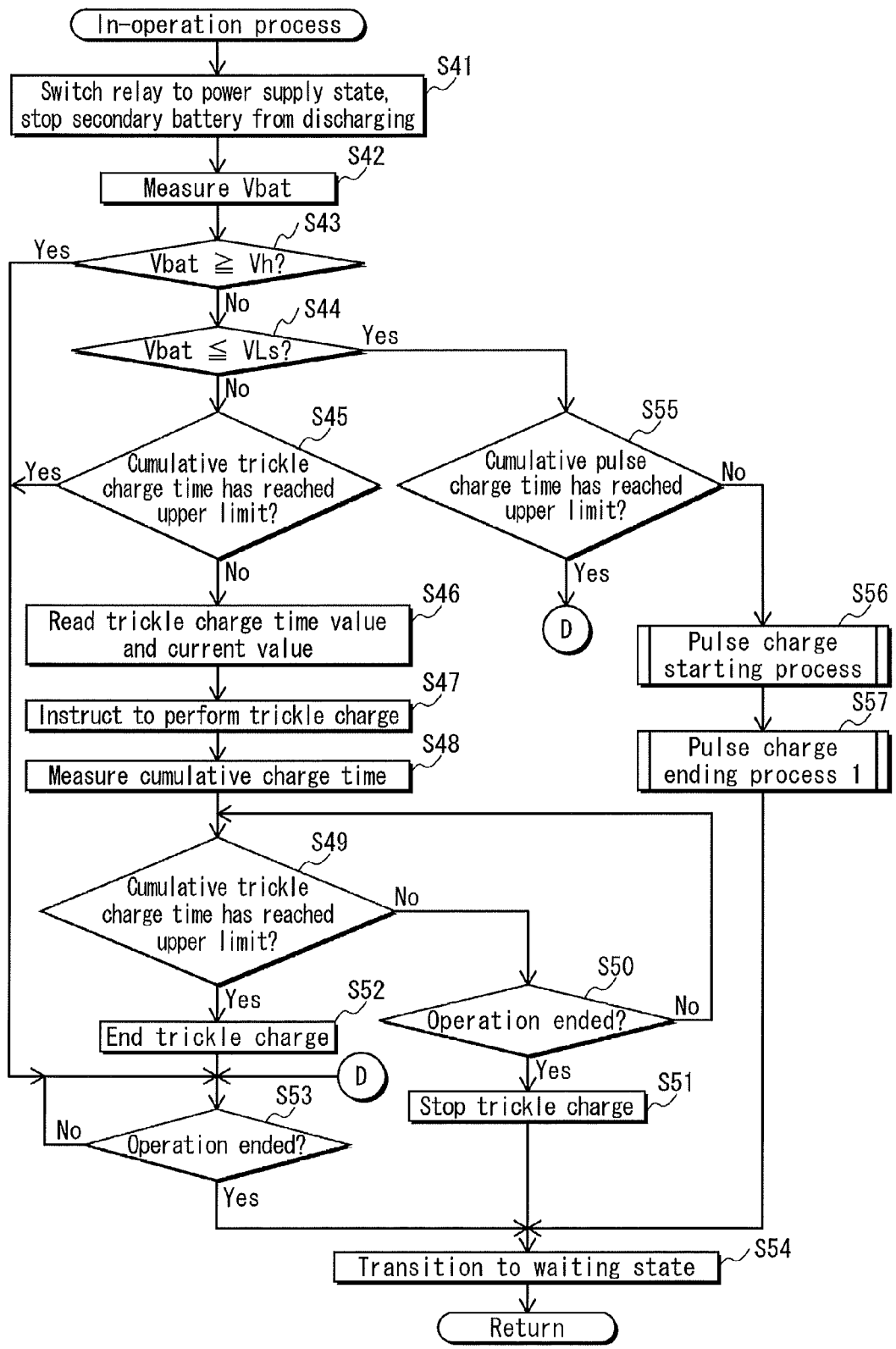
FIG. 5 is a flowchart illustrating the processing procedure of an in-operation process subroutine.

FIG. 5 is a flowchart illustrating the procedure of an in-operation process subroutine executed in step S5 illustrated in FIG. 2.

As illustrated in FIG. 5, the power-source controller 13 switches the latching type relay 17 from the power stop state to the power-supply state to allow the processing unit 20 to operate, and instructs the discharge controller 19 to stop the supply of power from the secondary battery 30 to the accepting unit 24 (discharge stop) (step S41). This allows the DC power output from the AC-DC power source 12 to be supplied to the image forming unit 21 and the accepting unit 24 of the processing unit 20, thereby enabling the processing unit 20 to transition to the operating state in which it can execute the image formation operation.

In this state, the power-source controller 13 measures the voltage (Vbat) of the secondary battery 30 to judge whether or not it is necessary to charge the secondary battery 30 with the DC power supplied from the AC-DC power source 12 (step S42). Subsequently, the power-source controller 13 judges whether or not the measured voltage Vbat of the secondary battery 30 is equal to or higher than the predetermined second judgment threshold voltage Vh (step S43).

When the power-source controller 13 judges that the measured voltage Vbat of the secondary battery 30 is equal to or higher than the predetermined second judgment threshold voltage Vh (Yes in step S43), the power-source controller 13 determines that the trickle charge is not necessary, and the control proceeds to step S53. In step S53, the power-source controller 13 is in the waiting state until it receives, from the main-body controller 21a of the image forming unit 21, a notification that the operating state of the processing unit 20 has ended. Note that, although it is described above that the trickle charge is not necessary when Vbat≥Vh, the trickle charge may be performed when Vbat≥Vh.

On the other hand, when it is judged that the measured voltage Vbat of the secondary battery 30 is lower than the predetermined second judgment threshold voltage Vh (No in step S43), it is judged whether or not the voltage Vbat of the secondary battery 30 is equal to or lower than the first judgment threshold voltage VLs stored (held) in the storage area of the power-source controller 13 (step S44).

When it is judged that the voltage Vbat of the secondary battery 30 is not equal or lower than the first judgment threshold voltage VLs, namely, VLs<Vbat<Vh (No in step S44), it is determined that although the capacity of the secondary battery 30 has decreased due to a self-discharge and a supply of power to the accepting unit 24, the voltage value has not decreased to the level of requiring execution of the pulse charge, and the control proceeds to step S45.

In step S45, it is judged whether or not the cumulative trickle charge time measured by the trickle charge timer 13c has reached the upper-limit value (one hour) of the cumulative trickle charge time.

When it is judged that the measured cumulative trickle charge time has reached the upper-limit value (Yes in step S45), the control proceeds to step S53 in which the power-source controller 13 is in the waiting state until it receives from the main-body controller 21a of the image forming unit 21a notification that the operating state of the processing unit 20 has ended.

When it is judged that the measured cumulative trickle charge time has not reached the upper-limit value (No in step S45), the trickle charge of the secondary battery 30 is executed (steps S46 through S53).

When the trickle charge is executed, the power-source controller 13 first reads the charge time value and charge current value, which are conditions for executing the trickle charge, from the storage unit 14 (step S46). The charge time value and charge current value for the trickle charge are set based on the charge characteristic of the secondary battery 30 and the like, and are stored in the storage unit 14 in advance.

The power-source controller 13 then instructs the charge controller 15 to charge the secondary battery 30 by the trickle charge in accordance with the read charge time value and charge current value (step S47).

Note that the charge current for the trickle charge in this case is set to a low current so that the self-discharge characteristic of the secondary battery 30 can be inhibited in the state where there is no connected load of the secondary battery 30. Accordingly, even if the trickle charge is performed for a predetermined time period for charging, there is no fear that the secondary battery 30 is overcharged.

The charge controller 15, in accordance with an instruction from the power-source controller 13, controls the DC power supplied from the AC-DC power source 12 to be the charge current set by the power-source controller 13, and supplies the charge current to the secondary battery 30. The charge controller 15 monitors the values of the voltage and current supplied to the secondary battery 30, and performs a control so that the charge current is stably supplied to the secondary battery 30 as set in advance. As a result, to prevent the values of the supplied voltage and current from deviating from the set values due to the loading state of the secondary battery 30, a feedback circuit, which enables a feedback control to be performed by monitoring the values of the supplied voltage and current, is used.

After instructing the charge controller 15 to charge the secondary battery 30 by the trickle charge, the power-source controller 13 causes the trickle charge timer 13c to measure the cumulative trickle charge time (step S48). Here, the trickle charge timer 13c measures the cumulative trickle charge time starting from the midnight, namely the start of one day which is defined as unit period of measurement of the cumulative trickle charge time, and each time a trickle charge is executed, the measured time of the execution is added to the cumulative trickle charge time.

Subsequently, it is judged whether or not the cumulative trickle charge time measured by the trickle charge timer 13c has reached the upper-limit value (one hour) of the cumulative trickle charge time (step S49). When it is judged that the measured cumulative trickle charge time has not reached the upper-limit value (one hour) (No in step S49), it is judged whether or not a notification, which indicates that the image formation operation of the image forming unit 21 has ended, has been received from the main-body controller 21a (step S50). When it is judged that the operation end notification has been received (Yes in step S50), the power-source controller 13 instructs the charge controller 15 to stop the trickle charge (step S51), and the control proceeds to step S54. Upon receiving the instruction, the charge controller 15 stops charging the secondary battery 30 by the trickle charge.

When it is judged that the measured cumulative trickle charge time has reached the upper-limit value (one hour) (Yes in step S49), the power-source controller 13 instructs the charge controller 15 to end the trickle charge (step S52), and the control proceeds to step S53. Upon receiving the instruction, the charge controller 15 ends charging the secondary battery 30 by the trickle charge.

When it is judged that the measured cumulative trickle charge time has reached the upper-limit value, it is determined that the trickle charge required for the day has been performed, and thereafter the trickle charge is not performed until the day passes even if the processing unit 20 has transitioned to the operating state.

In step S53, the power-source controller 13 is in the waiting state until it receives, from the main-body controller 21a of the image forming unit 21, a notification that the operating state of the processing unit 20 has ended. Subsequently, when it is judged that the operation end notification has been received (Yes in step S53), the control proceeds to step S54.

In step S54, to transition from the operating state to the waiting state, the waiting state flag indicating the waiting state is set, instead of the operating state flag indicating the operating state. After this return, when the present control is performed again, it is judged in step S4 (FIG. 2) that the image forming unit 21 is in the waiting state because the waiting state flag is set, and the control proceeds to the in-wait process (step S6).

When it is judged that the voltage Vbat of the secondary battery 30 is equal to or lower than the first judgment threshold voltage VLs (Yes in step S44), the control proceeds to step S55.

In step S55, it is judged whether or not the cumulative pulse charge time measured by the pulse charge timer 13b has reached the upper-limit value (one hour) of the cumulative pulse charge time.

When it is judged that the measured cumulative pulse charge time has not reached the upper-limit value (one hour) (No in step S55), it is determined that the remaining capacity of the secondary battery 30 has decreased due to a self-discharge and a supply of power to the accepting unit 24, thus a rapid charge of the secondary battery 30 is necessary, and a pulse charge starting process (step S56) and a pulse charge ending process 1 (step S57) are executed. Subsequently, the control proceeds to step S54 in which the state transitions to the waiting state, and the control returns.

<Pulse Charge Starting Process>

Figure 6:
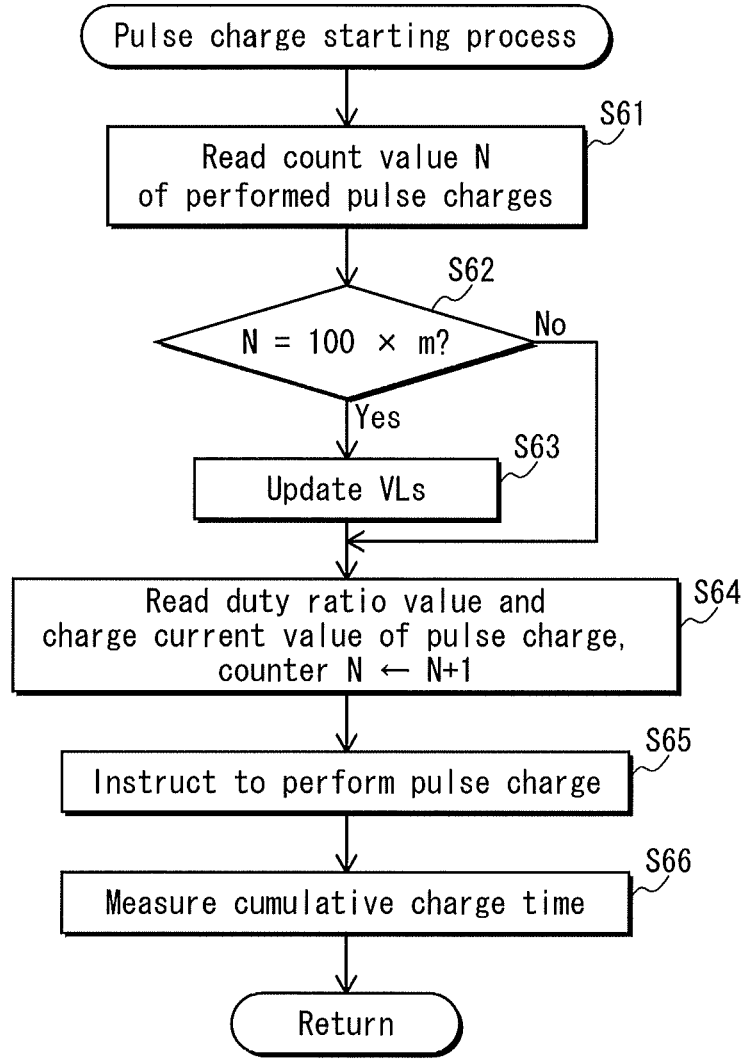
FIG. 6 is a flowchart illustrating the processing procedure of a pulse charge starting process subroutine.

FIG. 6 is a flowchart illustrating the procedure of a pulse charge starting process subroutine executed in step S56 illustrated in FIG. 5.

As illustrated in FIG. 6, the power-source controller 13 reads a count value N which is counted by the counter 13d and indicates the number of times the pulse charge is performed (step S61). Following this, it is judged whether or not the count value N indicating the number of times the pulse charge is performed is a multiple of 100 (100×m, wherein m is a positive integer) (step S62). When it is judged that the count value N is a multiple of 100 (Yes in step S62), an updated value of the first judgment threshold voltage VLs corresponding to the count value N is read from the storage area. The first judgment threshold voltage VLs stored in the storage area of the power-source controller 13 is then updated to the read updated value (step S63), and the control proceeds to step S64.

When it is judged that the count value N, which is counted by the counter 13d and indicates the number of times the pulse charge is performed, is not a multiple of 100 (No in step S62), the control proceeds to step S64, skipping step S63.

In step S64, to charge the secondary battery 30 by the pulse charge, the power-source controller 13 reads the duty ratio value and charge current value, which are conditions for performing the pulse charge, from the storage unit 14. Also, in step S64, the power-source controller 13 increments the count value N, which is counted by the counter 13d and indicates the number of times the pulse charge is performed, by one (N=N+1).

Following this, the power-source controller 13 instructs the charge controller 15 to charge the secondary battery 30 by the pulse charge in accordance with the read duty ratio value and charge current value (step S65).

Upon receiving the instruction, the charge controller 15 supplies the DC power supplied from the AC-DC power source 12 to the secondary battery 30 in accordance with the duty ratio value and charge current value set by the power-source controller 13, thereby charging the secondary battery 30 by the pulse charge. The charge controller 15 monitors the value of the current supplied to the secondary battery 30, and controls the DC power supplied from the AC-DC power source 12 so that the charge current with a predetermined duty ratio is supplied to the secondary battery 30.

After instructing the charge controller 15 to perform the pulse charge, the power-source controller 13 causes the pulse charge timer 13b to measure the cumulative pulse charge time (step S66), and the control returns. Here, the pulse charge timer 13b measures the cumulative pulse charge time of pulse charges that have been performed after the midnight, and the time period of this pulse charge is added to the measured cumulative pulse charge time.

<Pulse Charge Ending Process 1>

Figure 7:
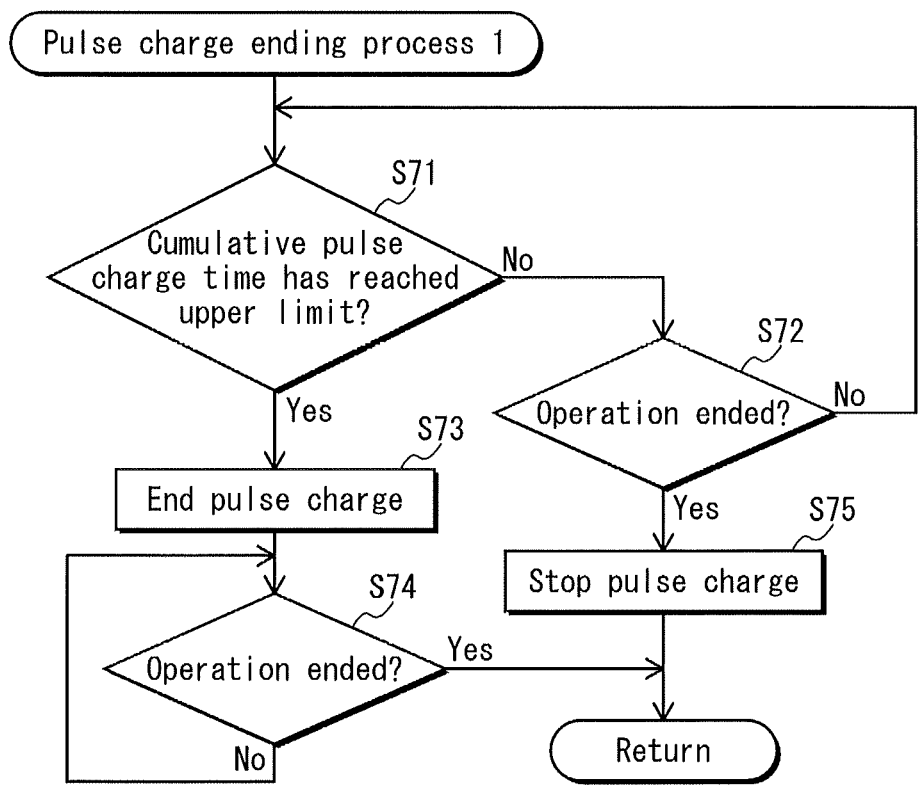
FIG. 7 is a flowchart illustrating the processing procedure of a pulse charge ending process 1 subroutine.

FIG. 7 is a flowchart illustrating the procedure of a pulse charge ending process 1 subroutine executed in step S57 illustrated in FIG. 5.

As illustrated in FIG. 7, the power-source controller 13 judges whether or not the cumulative pulse charge time measured by the pulse charge timer 13b has reached the upper-limit value (one hour) (step S71). When it judges that the measured cumulative pulse charge time has not reached the upper-limit (No in step S71), the power-source controller 13 judges whether or not a notification, which indicates that the image formation operation of the image forming unit 21 has ended, has been received from the main-body controller 21a (step S72).

When it is judged that the operation end notification has not been received from the main-body controller 21a (No in step S72), the control returns to step S71.

When it is judged that the operation end notification has been received from the main-body controller 21a (Yes in step S72) before the measured cumulative pulse charge time reaches the upper-limit value (No in step S71), the power-source controller 13 instructs the charge controller 15 to stop the pulse charge (step S75), and the control returns. Upon receiving the instruction, the charge controller 15 ends charging the secondary battery 30 by the pulse charge. Together with this, the pulse charge timer 13b stops measuring the cumulative pulse charge time. The measurement of the cumulative pulse charge time is also stopped when the pulse charge is either stopped or ended, which is described below.

When, during the performance of the pulse charge, it is judged that the measured cumulative pulse charge time has reached the upper-limit value (Yes in step S71) without receiving the operation end notification from the main-body controller 21a (No in step S72), the power-source controller 13 instructs the charge controller 15 to end the pulse charge (step S73). Upon receiving the instruction, the charge controller 15 ends charging the secondary battery 30 by the pulse charge.

After this, when it is judged that the operation end notification has been received from the main-body controller 21a (Yes in step S74), the control returns. When returning after the completion of step S74 or S75, the control proceeds to step S54 illustrated in FIG. 5. This allows the waiting state flag to be set, instead of the operating state flag.

When it is judged that the voltage Vbat of the secondary battery 30 is equal to or lower than the first judgment threshold voltage VLs (Vbat≤VLs: Yes in step S44), and that the measured cumulative pulse charge time has reached the upper-limit value (Yes in step S55), it is determined that the pulse charge required for the day has been performed, and thereafter the pulse charge is not performed (is prohibited) until the day passes even when the processing unit 20 transitions to the operating state, and the control proceeds to step S53.

As described above, the upper-limit of the pulse charge time is determined such that once the pulse charge is performed for the time period of the upper-limit value in one day, the voltage Vbat of the secondary battery 30 is not decreased to the first judgment threshold voltage VLs. However, depending on the use state of the device, the voltage Vbat of the secondary battery 30 may become equal to or lower than the first judgment threshold voltage VLs (Vbat≤VLs) after the pulse charge is performed for the upper-limit time period.

In that case, the voltage Vbat of the secondary battery 30 does not become higher than the first judgment threshold voltage VLs until the day passes, whereas one day is defined as the unit period of measurement of the cumulative pulse charge time. When the next day starts, the pulse charge timer 13b is reset (step S22 illustrated in FIG. 4), and when it is judged in step S55 after the reset that the measured cumulative pulse charge time has not reached the upper-limit value, the control proceeds to step S56, in which the pulse charge starting process is executed, and the pulse charge is performed.

This allows the secondary battery 30 to be recharged to the original capacity, and the voltage Vbat of the secondary battery 30 becomes equal to or higher than the first judgment threshold voltage VLs.

This applies to the case where, in the operating state, it is judged that the measured cumulative pulse charge time has reached the upper-limit value (Yes in step S71) and the pulse charge ends halfway (step S73).

<In-Wait Process>

Figure 8:
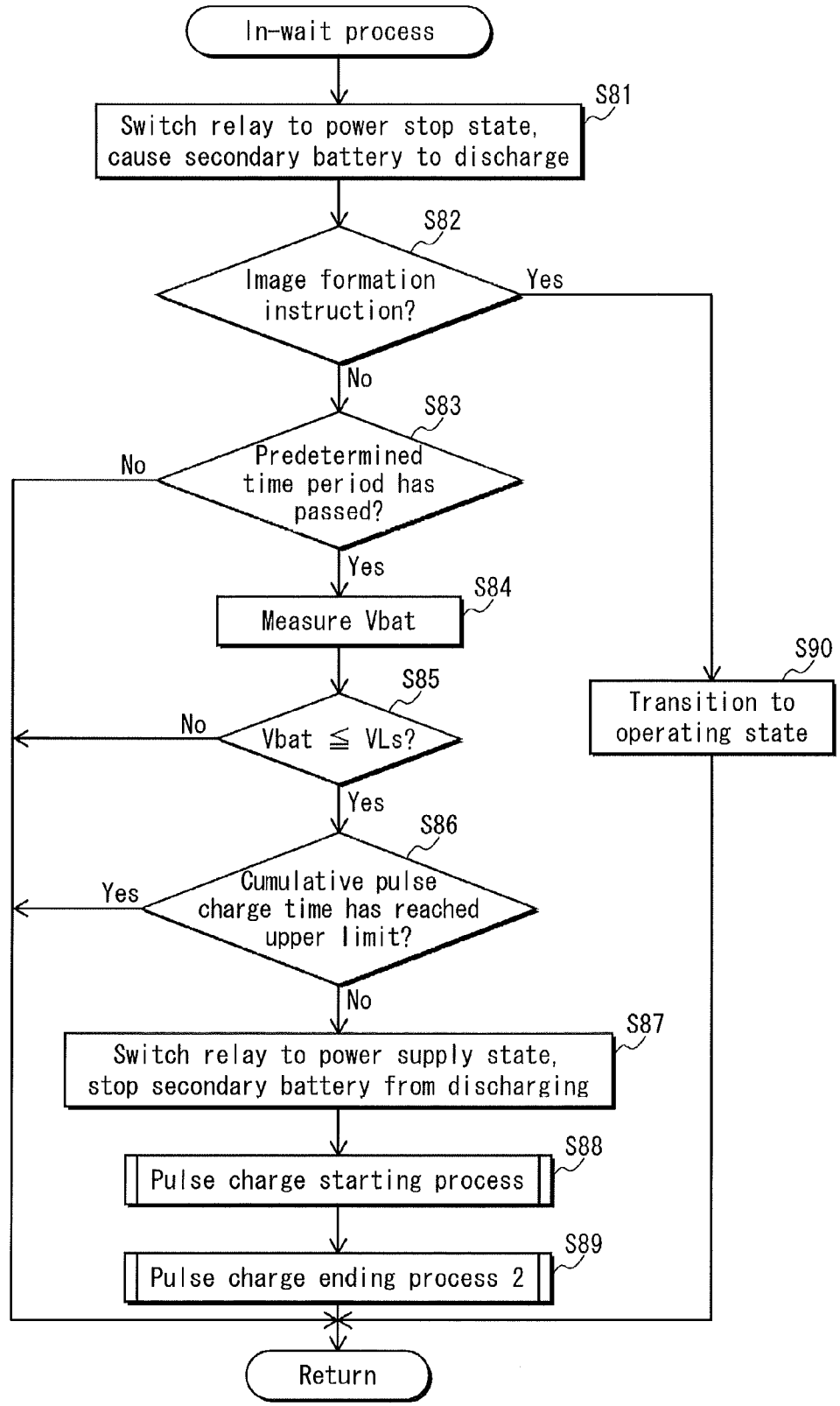
FIG. 8 is a flowchart illustrating the processing procedure of an in-wait process subroutine.

FIG. 8 is a flowchart illustrating the procedure of an in-wait process subroutine executed in step S6 illustrated in FIG. 2.

As illustrated in FIG. 8, the power-source controller 13 switches the latching type relay 17 to the power stop state to allow the processing unit 20 to be in the waiting state, and instructs the discharge controller 19 to supply power from the secondary battery 30 to the accepting unit 24 (discharge instruction) (step S81).

This establishes the waiting state in which the power from the commercial power source is not supplied to the processing unit 20, and only the accepting unit 24 can accept the image formation instruction with the power supplied from the secondary battery 30.

In the waiting state, when it is judged that the accepting unit 24 of the processing unit 20 has accepted an image formation instruction (processing request) (Yes in step S82), the operating state flag is set instead of the waiting state flag to transition from the waiting state to the operating state (step S90), and the control returns. After this return, when the present control is performed again, it is judged in step S4 that the image forming unit 21 is in the operating state because the operating state flag is set, and the control proceeds to the in-operation process (step S5).

When it is judged that the accepting unit 24 has not accepted an image formation instruction (processing request) (No in step S82), the control proceeds to step S83, in which, to measure the voltage Vbat of the secondary battery 30 once every predetermined time period (one hour, for example), it is checked whether or not the predetermined time period has passed.

When it is judged that the predetermined time period has not passed (No in step S83), the control returns. After this return, when the in-wait process is executed again, the control returns in the same manner if it is judged that the predetermined time period has not passed.

The process, in which steps S81 through S83 are performed and the control returns, is repeated until it is judged that the predetermined time period has passed (Yes in step S83), and then the control proceeds to step S84.

In step S84, the voltage (Vbat) of the secondary battery 30 is measured. The voltage (Vbat) of the secondary battery 30 is measured at least when an acceptance of an image formation process is completed, and when an image formation process is completed, and when a plurality of jobs are executed during an image processing time period, the voltage (Vbat) of the secondary battery 30 is measured after a predetermined time period passes, as well.

In that case, a learning function may be used in parallel to increase the frequency of measuring the voltage (Vbat) of the secondary battery 30 when, referring to the clock 13a, a time period comes in which a smaller number of jobs are likely to be accepted. More specifically, it is estimated that the number of times the device transitions to the waiting state increases when a few or zero workers are working in the office, as in the middle of the night. For this reason, it is desirable to use in parallel a learning function to increase the frequency of measuring the voltage (Vbat) of the secondary battery 30 when a time period comes in which the number of times the device transitions to the waiting state increases.

After the voltage Vbat of the secondary battery 30 is measured, it is judged whether or not the measured voltage Vbat is equal to or lower than the first judgment threshold voltage VLs (step S85).

When it is judged that the measured voltage Vbat is not equal to or lower than the first judgment threshold voltage VLs (No in step S85), the control returns.

When it is judged that the measured voltage Vbat is not equal to or lower than the first judgment threshold voltage VLs, the process, in which steps S81 through S85 are performed and the control returns, is repeated until it is judged that the measured voltage Vbat is equal to or lower than the first judgment threshold voltage VLs (Yes in step S85), and then the control proceeds to step S86.

In step S86, it is judged whether or not the cumulative pulse charge time measured by the pulse charge timer 13b has reached the upper-limit value (one hour).

When it is judged that the cumulative pulse charge time has not reached the upper-limit value (one hour) (No in step S86), it is determined that charging the secondary battery 30 by the pulse charge (rapid charge) is necessary, and the power-source controller 13 switches the latching type relay 17 to the power-supply state, and instructs the discharge controller 19 to stop the supply of power from the secondary battery 30 to the accepting unit 24 (discharge stop) (step S87). After this, the pulse charge starting process (step S88) and a pulse charge ending process 2 (step S89) are executed, and the control returns. The pulse charge starting process (step S88) is the same as the above-described pulse charge starting process (step S56), and thus the description thereof is omitted.

<Pulse Charge Ending Process 2>

Figure 9:
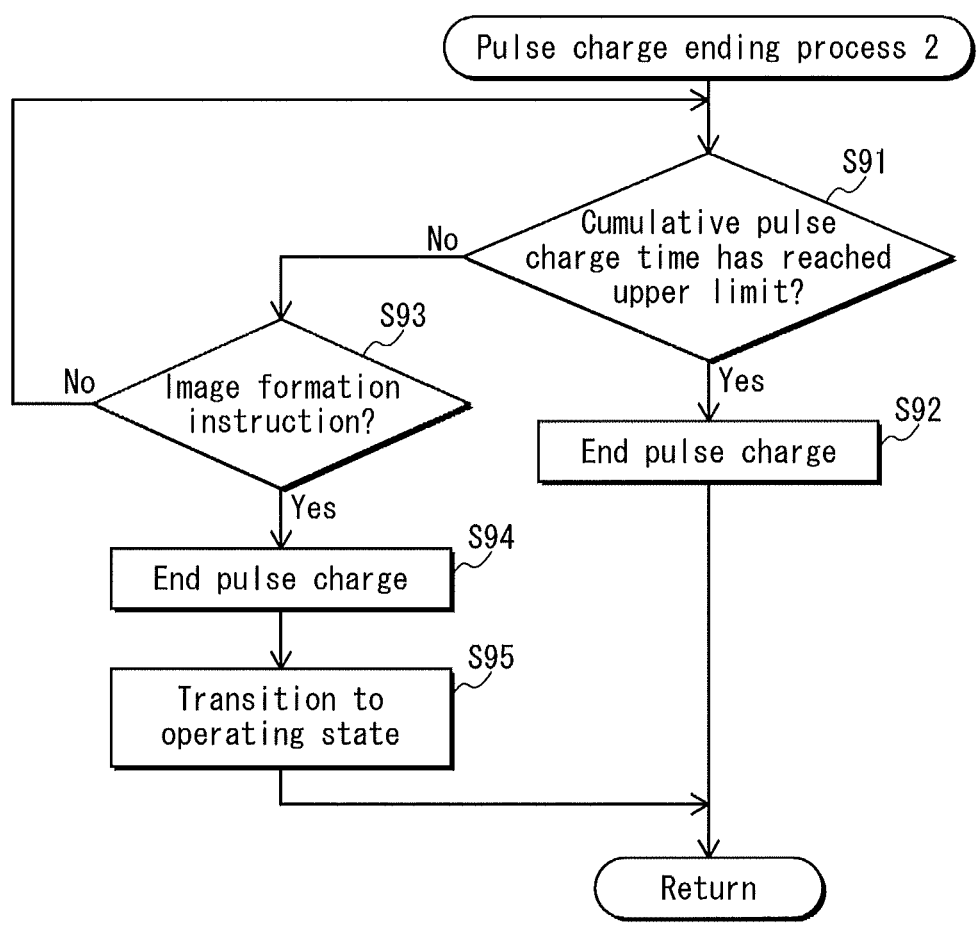
FIG. 9 is a flowchart illustrating the procedure of a pulse charge ending process 2 subroutine executed in step S89 illustrated in FIG. 8.

FIG. 9 is a flowchart illustrating the procedure of a pulse charge ending process 2 subroutine executed in step S89 illustrated in FIG. 8. The pulse charge ending process 2 is executed after the pulse charge is started by the pulse charge starting process (step S88).

As illustrated in FIG. 9, the power-source controller 13 judges whether or not the cumulative pulse charge time measured by the pulse charge timer 13b has reached the upper-limit value (one hour) (step S91).

When it judges that the measured cumulative pulse charge time has not reached the upper-limit (No in step S91), the power-source controller 13 judges whether or not a notification, which indicates that the accepting unit 24 of the processing unit 20 has accepted an image formation instruction (processing request) (step S93).

When it is judged that an image formation instruction (processing request) has not been accepted (Not in step S93), the control returns to step S91.

When it is judged that an image formation instruction (processing request) has been accepted (Yes in step S91) before the measured cumulative pulse charge time reaches the upper-limit value (No in step S91), the power-source controller 13 instructs the charge controller 15 to stop the pulse charge (step S94), and sets the operating state flag, instead of the waiting state flag, to transition from the waiting state to the operating state (step S95), and the control returns. After this return, when the present control is performed again, it is judged in step S4 in FIG. 2 that the image forming unit 21 is in the operating state because the operating state flag is set, and the control proceeds to the in-operation process (step S5).

When, during the performance of the pulse charge, it is judged that the measured cumulative pulse charge time has reached the upper-limit value (Yes in step S91) without accepting an image formation instruction (processing request) (No in step S93), it is determined that the pulse charge required for the day has been performed, whereas one day is defined as the unit period of measurement, and the power-source controller 13 instructs the charge controller 15 to end the pulse charge (step S92), and the control returns. Upon receiving the instruction, the charge controller 15 ends charging the secondary battery 30 by the pulse charge.

Back to FIG. 8, when it is judged that the measured cumulative pulse charge time has reached the upper-limit value (Yes in step S86), the control returns, skipping steps S87 through S89. In this case, as is the case with the process after step S55, it is determined that the pulse charge required for the day has been performed, whereas one day is defined as the unit period of measurement, and the pulse charge is not performed for the rest of the day even if the processing unit 20 is in the waiting state.

When the next day starts, the pulse charge timer 13b is reset (step S22 illustrated in FIG. 4), and when it is judged in step S86 after the reset that the measured cumulative pulse charge time has not reached the upper-limit value, the control proceeds to step S88, in which the pulse charge starting process is executed, and the pulse charge is performed. This allows the secondary battery 30 to be recharged to the original capac-ity, and the voltage Vbat of the secondary battery 30 becomes equal to or higher than the first judgment threshold voltage VLs.

In the above description, an upper-limit value for the cumulative trickle charge time in one day is set in advance, and the secondary battery 30 is charged by the trickle charge such that the trickle charge is performed until the cumulative charge time reaches the upper-limit value. However, not limited to this structure, the trickle charge may be performed until the secondary battery 30 reaches a predetermined voltage.

Also, the trickle charge is performed to complement the reduction in the capacity of the secondary battery 30 due to a self-discharge or the like during operations. However, if the secondary battery 30 can be used until the end of life only with the pulse charge without trickle charge, the trickle charge may not be performed.

As described above, the capacity of the secondary battery 30 reduces when the processing unit 20 is in the waiting state since it discharges (supplies power to the accepting unit 24). However, the voltage Vbat of the secondary battery 30 reduces to below the first judgment threshold voltage VLs, the pulse charge is performed while the processing unit 20 is in the operating state, and the secondary battery 30 is recharged to the original capacity.

Also, the upper-limit value of the cumulative pulse charge time in one day (24 hours from midnight), the unit period of measurement, is set to, for example, one hour so that the pulse charge, which is performed when the processing unit 20 is in the operating state, can charge the secondary battery 30 as much as an amount of capacity it consumes by discharging (supplying power to the accepting unit 24) when the processing unit 20 is in the waiting state.

Accordingly, even if the discharge of the secondary battery 30 (supply of power to the accepting unit 24) continues after the cumulative pulse charge time has reached the upper-limit value set for one day, the voltage Vbat of the secondary battery 30 does not reduce to a voltage level that is not sufficient to drive the accepting unit 24, and even if the power supply from the commercial power source is stopped in the waiting state, the accepting unit 24 can be operated stably with the power supplied from the secondary battery 30.

Furthermore, when the cumulative pulse charge time in one day reaches the upper limit (one hour), the pulse charge is no more performed for the rest of the day. This prevents the secondary battery 30 from becoming overcharged.

Furthermore, normally, it is rare for the image forming apparatus to be in the operating state for the whole day. The image forming apparatus is likely to be placed, for example, in the following environment. That is to say, the image forming apparatus is likely to be placed in an environment where the state changes frequently in such a manner that, upon receiving an image formation instruction from a user while it is in the waiting state, the image forming apparatus transitions to the operating state and executes an image formation job, then returns to the waiting state and after a while, when it receives an image formation instruction again from a user, it transitions to the operating state.

Some image formation jobs require a short processing time as in the case of printing one or two recording sheets, and other image formation jobs require a long processing time as in the case of printing a large number of booklets. Normal offices have a high rate of image formation jobs that require a short processing time. In the image formation jobs that require a short processing time, the length of time for which the pulse charge is performed during an execution of one image formation job is short as well. As a result, when a lot of image formation jobs in which the pulse charge is performed for a short period are executed, the voltage Vbat of the secondary battery 30 may not be increased to a sufficient level.

For example, the following phenomenon may occur. That is to say, a charge of the battery ends in the state where the voltage Vbat of the secondary battery 30 is slightly higher than the first judgment threshold voltage VLs. The trickle charge is not performed thereafter, and the voltage Vbat of the secondary battery 30 decreases to the first judgment threshold voltage VLs before the next image formation job is executed. Accordingly, the pulse charge is started at the same time as the next image formation job starts to be executed.

Such a phenomenon is likely to occur when a plurality of short-time image formation jobs are executed at short-time intervals. As the number of executions of such jobs increases, the number of times the pulse charge is performed increases.

When the pulse charge is performed a large number of times with the first judgment threshold voltage VLs being fixed to a constant value, a memory effect is likely to occur, as described above. However, in the present embodiment, the first judgment threshold voltage VLs is updated in such a manner that as the number of times the pulse charge is performed increases, the first judgment threshold voltage VLs is decreased. With this structure, compared with the structure where the first judgment threshold voltage VLs is fixed to a constant value, it is possible to make it difficult for the voltage Vbat of the secondary battery 30 to decrease due to the memory effect. By making it difficult for the memory effect to occur by the above structure, the secondary battery 30 is allowed to supply power to the accepting unit 24 for a long time period stably.

Figure 10:
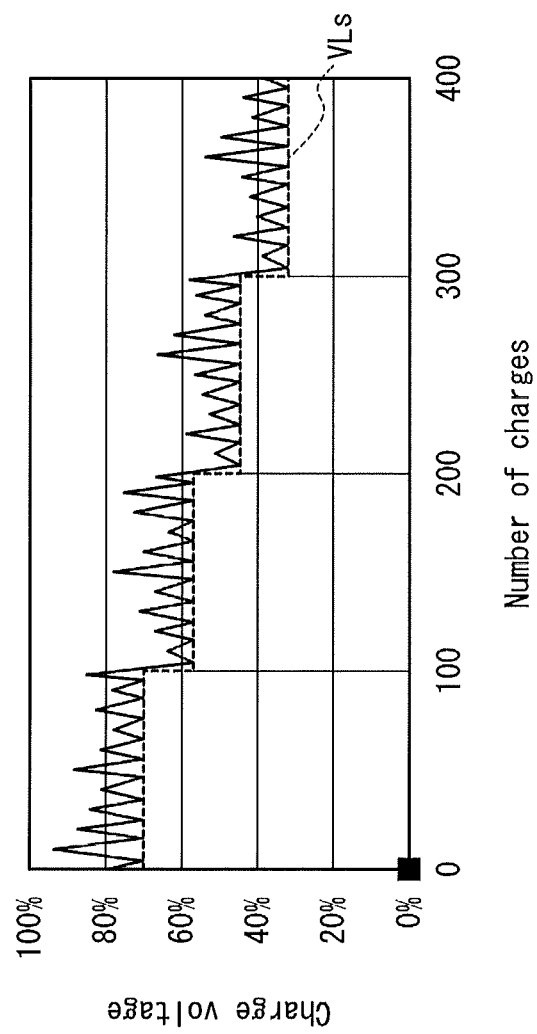
FIG. 10 is a graph schematically illustrating an example of change in voltage of the secondary battery in the case where the power-source controller charges the secondary battery.

FIG. 10 is a graph schematically illustrating an example of the change in voltage of the secondary battery 30 in the case of performing the pulse charge.

The vertical axis of the graph illustrated in FIG. 10 represents the appropriate range of charge voltages (0% (for example, 1.0 V) through 100% (for example, 1.7 V)), and the horizontal axis represents the number of times the pulse charge is performed to charge the secondary battery 30.

As illustrated in FIG. 10, in the voltage waveform, peaks and valleys appear alternately in such a manner that, when the voltage Vbat of the secondary battery 30 decreases to the first judgment threshold voltage VLs, the pulse charge is performed in accordance with the charge conditions having been set in advance for the secondary battery 30 to increase the voltage Vbat of the secondary battery 30, and after the pulse charge ends, when the voltage Vbat of the secondary battery 30 decreases to the first judgment threshold voltage VLs again, the pulse charge is performed again to increase the voltage Vbat of the secondary battery 30. One peak corresponds to a voltage change caused by one pulse charge. Note that FIG. 10 schematically illustrates the change of the voltage waveform, and the actual number of peaks is not equal to the number of charges illustrated along the horizontal axis.

With the above structure wherein the pulse charge is performed each time the voltage Vbat of the secondary battery 30 decreases to the first judgment threshold voltage VLs, it is possible to maintain the voltage Vbat of the secondary battery 30 at a voltage higher than the first judgment threshold voltage VLs.

Also with the above structure in which the first judgment threshold voltage VLs is updated in such a manner that each time the number of times the pulse charge is performed reaches 100, the first judgment threshold voltage VLs is lowered, it is possible to restrict the memory effect from occurring, which, on the other hand, is not possible with the structure in which the first judgment threshold voltage VLs is fixed to a constant value regardless of the number of times the charge is performed.

It is desirable that the timing at which the first judgment threshold voltage VLs is updated is set to the timing when the number of times the pulse charge is performed reaches a value that is a maximum permitted value of the number thereof with which a memory effect is not expected to occur in the secondary battery 30. In the above description, the timing at which the first judgment threshold voltage VLs is updated is set to the timing when the number of times the pulse charge is performed reaches 100, on the condition that it is confirmed that no memory effect occurs before the pulse charge is performed 100 times. Accordingly, in the present embodiment, as far as the pulse charge (additional charge) is performed 100 times or less, there is no fear that a memory effect occurs in the secondary battery 30 if the first judgment threshold voltage VLs is fixed to a constant value before the number of times the pulse charge is performed reaches 100.

As described above, in the present embodiment, the first judgment threshold voltage VLs, which is a threshold used in performing the pulse charge, is updated in such a manner that the greater the number of times the pulse charge is performed is, the lower the first judgment threshold voltage VLs is. With this structure, it is possible to prevent occurrence of the memory effect which would occur when the pulse charge is repeatedly performed in response to the occurrence of reduction of the voltage Vbat of the secondary battery 30 to the first judgment threshold voltage VLs. This makes it possible to supply power to the accepting unit 24 stably as necessary. In addition, this structure prevents such a judgment that the secondary battery 30 has come to the end of life much more shortly than expected due to an occurrence of the memory effect, although in the actuality it has not come to the end of life.

Furthermore, with the structure of the present embodiment in which the first judgment threshold voltage VLs is updated in such a manner that the greater the number of times the pulse charge is performed is, the lower the first judgment threshold voltage VLs is, it is possible to restrict deterioration of the secondary battery 30, which, on the other hand, is not possible with the structure in which the first judgment threshold voltage VLs is updated in such a manner that the greater the number of times the pulse charge is performed is, the higher the first judgment threshold voltage VLs is.

That is to say, if the first judgment threshold voltage VLs is updated in such a manner that the greater the number of times the pulse charge is performed is, the higher the first judgment threshold voltage VLs is, the timing of starting the pulse charge comes earlier and the pulse charge is performed more times per unit time period than the case where the first judgment threshold voltage VLs is updated in such a manner that the greater the number of times the pulse charge is performed is, the lower the first judgment threshold voltage VLs is. This may accelerate the deterioration of the secondary battery 30 and shorten the life of the secondary battery 30.

On the other hand, in the case of the present embodiment in which the first judgment threshold voltage VLs is updated in such a manner that the greater the number of times the pulse charge is performed is, the lower the first judgment threshold voltage VLs is, the timing of starting the pulse charge is delayed, thereby restricting the number of times the pulse charge is performed from increasing. The greater the number of pulse charges performed is, the more the secondary battery 30 is deteriorated gradually. Accordingly, by restricting the number of times the pulse charge is performed from increasing, it is possible to extend the life of the secondary battery 30 and use the secondary battery 30 for a long term stably.

Also, according to the present embodiment, each time the number of times the pulse charge is performed reaches 100, the first judgment threshold voltage VLs is lowered at a predetermined rate. This structure eliminates the need to detect the voltage Vbat of the secondary battery 30 with high accuracy. For example, if the first judgment threshold voltage VLs is lowered each time the pulse charge is performed, it is necessary to set the amount of change of the first judgment threshold voltage VLs in each update to be relatively small.

In that case, each time the pulse charge is performed (namely, each time the number of times the pulse charge is performed increases by one), it is necessary to detect whether or not the voltage Vbat of the secondary battery 30 is equal to or lower than the first judgment threshold voltage VLs that has been updated to be lower than the previous value by a relatively small amount of change. Thus it is necessary to detect the voltage Vbat of the secondary battery 30 with high accuracy.

On the other hand, with the structure of the present embodiment, the first judgment threshold voltage VLs is updated each time the number of times the pulse charge is performed reaches 100, it is possible to set that the first judgment threshold voltage VLs is updated to be lower than the previous value by a relatively large amount of change. This eliminates the need to detect the voltage Vbat of the secondary battery 30 with high accuracy, compared with the case where the first judgment threshold voltage VLs is updated by a relatively large amount of change each time the pulse charge is performed.

Of course the present invention is not limited to the above example of the update timing of the first judgment threshold voltage VLs. For example, in the case of detecting the voltage Vbat of the secondary battery 30 with high accuracy, the first judgment threshold voltage VLs may be updated each time the number of times the pulse charge is performed reaches one or a relatively small number. Also, for example, the timing at which the first judgment threshold voltage VLs is updated is set to the timing when the number of times the pulse charge is performed reaches an appropriate value that is 100 or lower, based on a characteristic such as the likelihood of the memory effect to occur in the secondary battery 30, or the life of the secondary battery 30.

Furthermore, the present invention may have a structure similar to that of the above embodiment wherein the first judgment threshold voltage VLs is updated in such a manner that while the temperature of the secondary battery 30 is within a predetermined range, basically the first judgment threshold voltage VLs is lowered at a predetermined rate each time the number of times the pulse charge is performed reaches a predetermined number, and when the temperature of the secondary battery 30 is lower than the predetermined range, a predetermined voltage is added (in step S63) based on the data of the threshold voltage (a straight line, curve or the like representing change over time) in the case where the threshold voltage is lowered over time (including the number times the charge is performed), taking account of the influence of the temperature. In that case, the threshold voltage is updated each time the time passes a predetermined time period, taking account of the characteristics of the secondary battery.

Furthermore, the present invention may have a structure in which the first judgment threshold voltage VLs is updated in such a manner that the greater the number of times the first judgment threshold voltage VLs is updated is, the less the amount of decrease in the first judgment threshold voltage VLs from the previous value of the first judgment threshold voltage VLs is. This is based on the following reasons. That is to say, the greater the number of times the first judgment threshold voltage VLs is updated is, the lower the first judgment threshold voltage VLs is. Also, the charge voltage of the secondary battery 30 decreases as a whole to the lower-limit value of the appropriate charge voltage range. When this happens, there is less allowance for the power to be supplied to the accepting unit 24. In view of this, the present invention may have a structure in which the first judgment threshold voltage VLs is updated in such a manner that the greater the number of times the first judgment threshold voltage VLs is updated is, the less the amount of decrease in the first judgment threshold voltage VLs from the previous value of the first judgment threshold voltage VLs is, by using in parallel a learning function that can respond to the operating state of the image forming apparatus installed in an office, more specifically, respond to a time period in which the image forming apparatus is in the waiting state in the office when the number of workers working in the office reduces to a few or zero. With this structure, it is possible to secure an amount of power sufficient to be supplied to the secondary battery 30 by the pulse charge, by restricting the charge voltage from decreasing in charging the secondary battery 30 by the pulse charge.

Furthermore, not limited to the structure in which the first judgment threshold voltage VLs is updated each time the number of times the pulse charge is performed reaches a predetermined number (for example, 100), the present invention may have a structure in which the first judgment threshold voltage VLs is updated in such a manner that the greater the number of times the first judgment threshold voltage VLs is updated is, the longer the period between two consecutive updates is. For example, it may be set that the first judgment threshold voltage VLs is updated when the number of times the pulse charge is performed reaches 300, 600, 1000, 1400, 1900, . . . .

When the secondary battery 30 has a characteristic that the closer it comes to the end of life, the smaller the number of charges with which a memory effect does not occur is, it is possible to restrict, more efficiently, the memory effect from occurring by shortening the interval between updates of the first judgment threshold voltage VLs in correspondence with the increase in the number of times the update is performed. When the secondary battery 30 has a reverse characteristic with regard to the memory effect, it is possible, for example, to lengthen the interval between updates of the first judgment threshold voltage VLs in correspondence with the increase in the number of times the update is performed.

Note that in the above embodiment, as a rapid charge of the secondary battery 30, the pulse charge is performed. However, not limited to such a charge method, another charge method, such as an intermittent charge method, may be used as far as it can recharge the secondary battery 30 to the original capacity in a relatively short time period.

Furthermore, in the above embodiment, an amount of power consumed by the secondary battery 30 during 23 hours of waiting state in one day is recharged by the rapid charge that is executed during one hour of the operating state. However, not limited to this structure, the time period during which the rapid charge is performed may be set to more than or less than one hour, based on the operation time and wait time of the processing unit 20, the charge characteristic of the secondary battery 30 and the like. Furthermore, in the above embodiment, the unit period of measurement of the cumulative pulse charge time is set to one day (24 hours). However, not limited to this, any time period may be set as the unit period of measurement. Also, in the above embodiment, the timer measuring the unit period of measurement is reset at midnight, namely, the start of the unit period is set to midnight. However, not limited to this, the start of the unit period of measurement may be set to other time, for example, the start of the business day, such as 9:00 a.m.

In that case, the MFP device is in the waiting state until 9:00 a.m., and after 9:00 a.m., each time it receives an image formation job processing request from a user, it transitions from the waiting state to the operating state. As described above, the secondary battery 30 is recharged for a predetermined length of time each day by the pulse charge (rapid charge) so that as much as an amount of power consumed during the waiting state in the day is recharged. Accordingly, it is presumed that, at immediately before 9:00 a.m., the voltage Vbat of the secondary battery 30 has decreased to a value close to the first judgment threshold voltage VLs. For this reason, the management model may be changed to the one in which the time information for monitoring the charging of the secondary battery 30 matches the start of the business day. In the present embodiment, the management model can be changed easily by changing the information stored in the storage unit 14.

In the case of the changed management model, after 9:00 a.m., each time the processing unit 20 transitions to the operating state, the trickle charge is performed, and then when the cumulative trickle charge time exceeds the upper-limit value, the trickle charge is stopped, and the voltage decrease of the secondary battery 30 progresses. When the voltage of the secondary battery 30 decreases to the first judgment threshold voltage VLs in the operating state, the secondary battery 30 is recharged by the pulse charge such that the voltage Vbat of the secondary battery 30 is resumed, and then the state transitions to the waiting state in which the pulse charge is stopped and power is supplied from the secondary battery 30 to the accepting unit 24.

With this structure, a charge and a charge-stop is repeated as follows until the end of the business day: the voltage Vbat of the secondary battery 30 is increased by the pulse charge, the state transitions to the waiting state in which the pulse charge is stopped and power is supplied from the secondary battery 30 to the accepting unit 24, thereby the voltage of the secondary battery 30 is decreased, and when the state transitions to the operating state again and the voltage of the secondary battery 30 is decreased to the first judgment threshold voltage VLs, the secondary battery 30 is recharged by the pulse charge.

In this way, setting the start of the unit period of measurement to the start of the business day that matches the office environment makes it easier to maintain the state where the pulse charge is performed in the operating state, power is supplied to the accepting unit 24 in the waiting state, and the voltage Vbat of the secondary battery 30 is equal to or higher than the first judgment threshold voltage VLs. Accordingly, the start of the unit period of measurement may be set to a time that matches the environment of the office in which the MFP device is placed.

Figure 11:
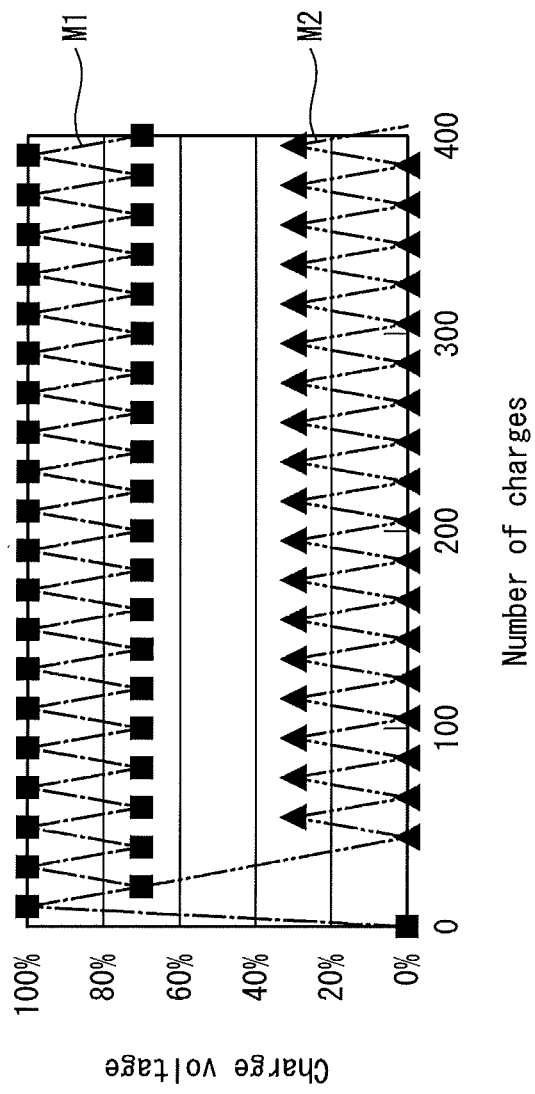
FIG. 11 is a graph illustrating a model of change in voltage of a secondary battery (a general secondary battery) in the case where a rapid charge is performed each time the voltage decreases to a predetermined threshold voltage.

FIG. 11 illustrates a model of change of the voltage Vbat in the case of an ordinary secondary battery that is observed when the pulse charge (rapid charge) is performed for a predetermined length of time each time the voltage Vbat of the secondary battery decreases to the first judgment threshold voltage (in this case, the first judgment threshold voltage is a constant value regardless of the number of charges performed).

As is the case of the graph illustrated in FIG. 10, the vertical axis of the graph illustrated in FIG. 11 represents the appropriate range of charge voltages (0% through 100%), and the horizontal axis represents the number of times the pulse charge is performed to charge the secondary battery 30.

The one-dot chain line in FIG. 11 indicates the case of a first charge model M1 in which the first judgment threshold voltage is set to 70% of the appropriate range of charge voltages; and the two-dot chain line in FIG. 11 indicates the case of a second charge model M2 in which the first judgment threshold voltage is set to the lower-limit value (0%) of the appropriate range of charge voltages.

As illustrated in the graph of FIG. 11, in the first charge model M1, the pulse charge is performed for each occurrence of a relatively small reduction of voltage of the secondary battery (reduction to 70% of the appropriate range of charge voltages), and thus the voltage Vbat of the secondary battery can be increased to the upper-limit value (100%) of the appropriate range of charge voltages.

However, in the first charge model M1, the memory effect may occur and the voltage Vbat of the secondary battery may rapidly decrease at the timing when the remaining capacity of the secondary battery reaches the threshold for starting the additional charge, after the additional charge is repeatedly performed. In that case, it may be considered that the secondary battery has come to the end of life, judging from the decrease of the voltage of power supplied from the secondary battery.

Also, in the first charge model M1, when the capacity and the voltage of the secondary battery do not match accurately, the secondary battery may be overcharged, with the voltage Vbat of the secondary battery exceeding the upper-limit value (100%) of the appropriate range of charge voltages. When the secondary battery is overcharged frequently, the deterioration of the secondary battery may be accelerated and the life of the secondary battery may be reduced.

In the second charge model M2, the pulse charge is performed for each occurrence of reduction of voltage of the secondary battery to the lower-limit value (0%) of the appropriate range of charge voltages, and thus the voltage Vbat of the secondary battery can only be increased to approximately 30% of the appropriate range of charge voltages even when the secondary battery 30 is charged for a predetermined time period by the pulse charge. In this case, too, the secondary battery cannot supply a predetermined voltage, and it may be considered that the secondary battery 30 has come to the end of life.

In the present embodiment, the first judgment threshold voltage VLs, which is a threshold set to start the pulse charge, is updated in such a manner that the greater the number of times the pulse charge is performed is, the lower the first judgment threshold voltage VLs is. With this structure, in contrast to the first charge model M1 and the second charge model M2, there is no fear for the secondary battery to be deteriorated, for the voltage of the secondary battery to be decreased due to the memory effect, or for the secondary battery to be recharged inappropriately, etc. As a result, the present embodiment makes it possible to extend the life of the secondary battery 30 and to cause the secondary battery 30 to supply as much amount of power as required by the processing unit 20 in the waiting state until the processing unit 20 reaches the end of life.

<Modifications>

Figure 12:
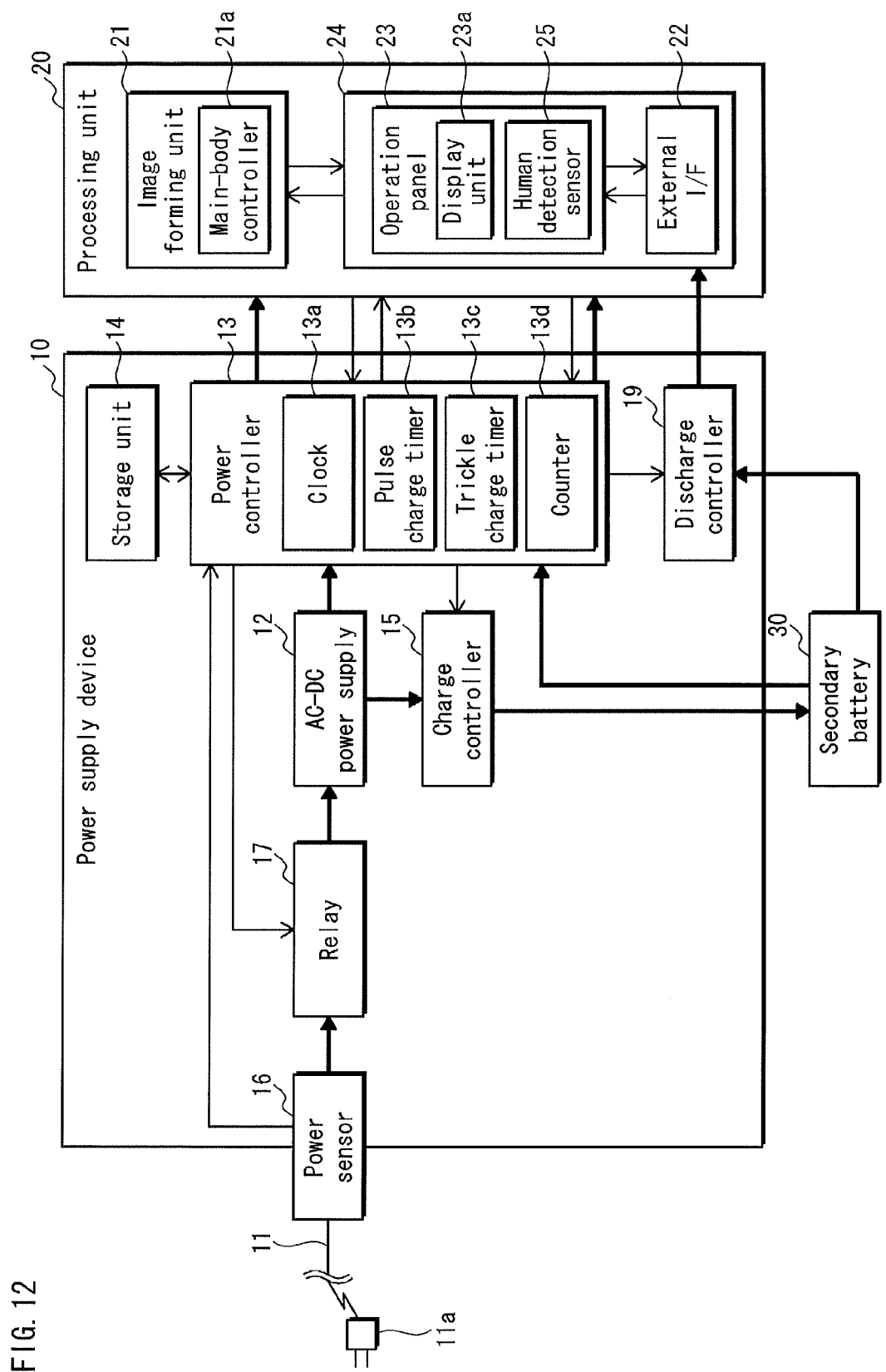
FIG. 12 is a block diagram illustrating the structure of an MFP device in a modification to the electronic device of the present invention.

In the above embodiment, the accepting unit includes an external interface and an operation panel. However, the present invention is not limited to this structure. For example, as illustrated in FIG. 12, the accepting unit 24 may further include a human detection sensor 25 that senses an approach of a predetermined IC card, mobile phone or the like. This structure enables the device to transition to the operating state when the human detection sensor 25 senses an approach of a user carrying a predetermined IC card, mobile phone or the like to the accepting unit 24.

Also, in the above embodiment, the latching type relay 17 is used to allow or stop the supply of the current from the commercial power source to the AC-DC power source 12. However, not limited to this structure, a relay driven by a solenoid may be used instead. Alternatively, the relay 17 may be replaced with, for example, a main power-source rocker switch having an off-delay function.

Furthermore, in the above embodiment, an MFP device for executing the image formation operation is used as the electronic device. However, not limited to the MFP device, the present invention is applicable to other electronic devices as far as they include an accepting unit that receives a power supply from the secondary battery, in the waiting state.

Summary of Embodiments

With the above structure of the electronic device of the present invention, the threshold voltage of the secondary battery at which the first charge control operation is started is updated in response to an increase in the number of times the first charge control operation is executed on the secondary battery. This makes it possible to prevent the memory effect from occurring due to the additional charge in which the first charge control operation is repeatedly executed with a constant threshold voltage. Also, in the above electronic device, the controller may decrease the threshold voltage as an update in response to the increase in the number of times the first charge control operation is executed. Compared with the case where the threshold voltage is increased in response to the increase in the number of times the first charge control operation is executed, the above structure makes it possible to restrict the increase in the number of times the first charge control operation is executed on the secondary battery. This makes it possible to restrict deterioration of the secondary battery and use the secondary battery for a long time period stably.

The present invention is applicable to an electronic device including an accepting unit for accepting a processing request and a processing unit for executing the accepted process, and useful as a technology for charging, by a rapid charge, a secondary battery that supplies power to the accepting unit.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An electronic device comprising:
a processing unit that includes an accepting part configured to accept a processing request from an external device, and is configured to execute a process specified by the processing request;
a secondary battery connected with an external power source; and
a power-source device configured to transition from a waiting state to an operating state when the accepting part accepts a processing request while in the waiting state, and then transition from the operating state to the waiting state when the processing unit completes executing the process, wherein, in the waiting state, power supply from the external power source to the processing unit is stopped and the secondary battery supplies power to the accepting part, and in the operating state, power is supplied from the external power source to the processing unit,
the power-source device including a controller that is configured to execute a first charge control operation to cause the external power source to charge the secondary battery when, in the operating state, a voltage of the secondary battery is equal to or lower than a threshold voltage, and end executing the first charge control operation when the operating state transitions to the waiting state,
the controller updating the threshold voltage in response to an increase in the number of times the first charge control operation is executed,
wherein the first charge control operation is a charge control operation in which the controller charges the secondary battery intermittently, and
wherein the controller performs a pulse charge control as the first charge control operation based on a duty ratio, a charge time and a current value that are set in advance.

2. The electronic device of claim 1, wherein
the controller decreases the threshold voltage as an update in response to the increase in the number of times the first charge control operation is executed.

3. The electronic device of claim 2, wherein
the controller decreases the threshold voltage as the update each time the number of times the first charge control operation is executed reaches a predetermined value.

4. An electronic device comprising:
a processing unit that includes an accepting part configured to accept a processing request from an external device, and is configured to execute a process specified by the processing request;
a secondary battery connected with an external power source; and
a power-source device configured to transition from a waiting state to an operating state when the accepting part accepts a processing request while in the waiting state, and then transition from the operating state to the waiting state when the processing unit completes executing the process, wherein, in the waiting state, power supply from the external power source to the processing unit is stopped and the secondary battery supplies power to the accepting part, and in the operating state, power is supplied from the external power source to the processing unit,
the power-source device including a controller that is configured to execute a first charge control operation to cause the external power source to charge the secondary battery when, in the operating state, a voltage of the secondary battery is equal to or lower than a threshold voltage, and end executing the first charge control operation when the operating state transitions to the waiting state,
the controller updating the threshold voltage in response to an increase in the number of times the first charge control operation is executed,
wherein the controller includes a measuring unit configured to measure a cumulative operation time of the first charge control operation during a unit period of measurement, and
when the cumulative operation time measured by the measuring unit reaches a predetermined time period, the controller prohibits the first charge control operation from being executed until the unit period of measurement is passed, or until the voltage of the secondary battery becomes equal to or lower than the threshold voltage.

5. The electronic device of claim 1, wherein
when, in the operating state, the voltage of the secondary battery is higher than the threshold voltage, the controller charges the secondary battery by executing a second charge control operation that is different from the first charge control operation.

6. An electronic device comprising:
a processing unit that includes an accepting part configured to accept a processing request from an external device, and is configured to execute a process specified by the processing request;
a secondary battery connected with an external power source; and
a power-source device configured to transition from a waiting state to an operating state when the accepting part accepts a processing request while in the waiting state, and then transition from the operating state to the waiting state when the processing unit completes executing the process, wherein, in the waiting state, power supply from the external power source to the processing unit is stopped and the secondary battery supplies power to the accepting part, and in the operating state, power is supplied from the external power source to the processing unit,
the power-source device including a controller that is configured to execute a first charge control operation to cause the external power source to charge the secondary battery when, in the operating state, a voltage of the secondary battery is equal to or lower than a threshold voltage, and end executing the first charge control operation when the operating state transitions to the waiting state,
the controller updating the threshold voltage in response to an increase in the number of times the first charge control operation is executed,
wherein when, in the operating state, the voltage of the secondary battery is higher than the threshold voltage, the controller charges the secondary battery by executing a second charge control operation that is different from the first charge control operation, and
wherein the controller performs a trickle charge control as the second charge control operation based on a current value and a charge time that are set in advance.

7. The electronic device of claim 1, wherein
the processing unit includes an image forming unit, and the accepting unit includes an external interface.

8. A power-source device provided in an electronic device,
the electronic device comprising:
a processing unit that includes an accepting part configured to accept a processing request from an external device, and is configured to execute a process specified by the processing request; and
a secondary battery connected with an external power source,
the power-source device comprising:
a controller configured to transition from a waiting state to an operating state when the accepting part accepts a processing request in the waiting state, and then transition from the operating state to the waiting state when the processing unit completes executing the process, wherein, in the waiting state, power supply from the external power source to the processing unit is stopped and the secondary battery supplies power to the accepting part, and in the operating state, power is supplied from the external power source to the processing unit,
the controller executing a first charge control operation to cause the external power source to charge the secondary battery when, in the operating state, a voltage of the secondary battery is equal to or lower than a threshold voltage, and performing a control to end executing the first charge control operation when the operating state transitions to the waiting state, and a control to update the threshold voltage in response to an increase in the number of times the first charge control operation is executed,
wherein the first charge control operation is a charge control operation in which the controller charges the secondary battery intermittently, and
wherein the controller performs a pulse charge control as the first charge control operation based on a duty ratio, a charge time and a current value that are set in advance.

* * * * *